US00RE38183E

(19) United States
(12) Reissued Patent
Kosich et al.

(10) Patent Number: US RE38,183 E
(45) Date of Reissued Patent: Jul. 15, 2003

(54) SYNCHRONIZATION CIRCUIT FOR VISUAL/AUDIO ALARMS

(75) Inventors: Joseph Kosich, South Toms River, NJ (US); Edward V. Applegate, Toms River, NJ (US)

(73) Assignee: Wheelock Inc., Long Branch, NJ (US)

(21) Appl. No.: 08/818,224

(22) Filed: Mar. 14, 1997

Related U.S. Patent Documents

Reissue of:
(64) Patent No.: 5,400,009
Issued: Mar. 21, 1995
Appl. No.: 08/133,519
Filed: Oct. 7, 1993

(51) Int. Cl.[7] ..... G08B 5/00
(52) U.S. Cl. ..... 340/331; 315/200 A; 315/241 S; 340/286.05; 340/332
(58) Field of Search ..... 340/331, 332, 340/333, 293, 286.05, 286.11, 326; 365/200 A, 241 S

(56) References Cited

U.S. PATENT DOCUMENTS

| | | | | |
|---|---|---|---|---|
| 3,488,558 A | | 1/1970 | Grafton | 315/210 |
| 3,881,130 A | | 4/1975 | Stiller | 315/230 |
| 3,969,720 A | | 7/1976 | Nishino | 340/309.4 |
| 3,973,168 A | | 8/1976 | Kearsley | 315/232 |
| 4,216,413 A | | 8/1980 | Plas | 315/323 |
| 4,389,632 A | | 6/1983 | Seidler | 315/200 A |
| 4,449,073 A | | 5/1984 | Mongoven et al. | 340/331 |
| 4,471,232 A | | 9/1984 | Peddie et al. | 307/35 |
| 4,472,714 A | | 9/1984 | Johnson | 340/931 |
| 4,899,131 A | | 2/1990 | Wilk et al. | 340/518 |
| 5,019,805 A | | 5/1991 | Curl et al. | 340/628 |
| 5,121,033 A | | 6/1992 | Kosich | 340/331 |
| 5,341,069 A | | 8/1994 | Kosich et al. | 315/241 S |
| 5,559,492 A | * | 9/1996 | Stewart et al. | 340/331 |
| 5,598,139 A | * | 1/1997 | Karim et al. | 340/286.11 |
| 5,659,287 A | * | 8/1997 | Donati et al. | 340/331 |

* cited by examiner

*Primary Examiner*—Brent A. Swarthout

(57) ABSTRACT

A strobe alarm system which includes multiple normally self-timed strobe circuits connected in a common loop to a fire alarm control panel, and a sync control circuit, which may be incorporated in the fire alarm control panel, for causing the strobes to flash in synchronism at a predetermined rate which will insure that a person viewing the multiple strobes would not see flash rates higher than the predetermined synchronized rate, which is preferably less than five flashes per second. The sync control circuit does not interfere with the supervision functions of the alarm system, and when an alarm condition is present it supplies power to the strobe circuits which it then interrupts once every flash cycle to cause a sync trigger circuit in each strobe to fire its flashtube, and to reset the internal timer of each strobe to ready it for arrival of the next sync signal. Each strobe circuit in the loop includes a resettable timer for recycling its own flash unit in a non-synchronous fail-safe mode in case the sync signal should fail to appear within a finite period following the last previous flash. That is, normally the strobes are all fired at the same time in response to sync signals applied to their sync trigger circuits, but in the event the sync signal is lacking the strobes will continue to flash, each at a rate determined by its internal timer.

47 Claims, 12 Drawing Sheets

SYNCHRONIZATION CIRCUIT FOR VISUAL/AUDIO ALARMS

Matter enclosed in heavy brackets [ ] appears in the original patent but forms no part of this reissue specification; matter printed in italics indicates the additions made by reissue.

BACKGROUND OF THE INVENTION

This invention relates to circuits for electronic strobe lights such as are used to provide visual warning in electronic fire alarm devices and other emergency warning devices and, more particularly, to a control circuit for causing plural strobes connected to the same fire alarm control panel to flash on synchronism with one another.

Strobe lights are used to provide visual warning of potential hazards or to draw attention to an event or activity. An important field of use for strobe lights is in electronic fire alarm systems, frequently in association with audible warning devices, such as horns, to provide an additional means for alerting persons who may be in danger. Strobe alarm circuits include a flashtube and a trigger circuit for initiating firing of the flashtube, with the energy for the flash typically supplied from a capacitor connected in shunt with the flashtube. In some known systems, the flash occurs when the voltage across the flash unit (i.e., the flashtube and associated trigger circuit) exceeds the threshold value required to actuate the trigger circuit, and in others the flash is triggered by a timing circuit. After the flashtube is triggered it becomes conductive and rapidly discharges the stored energy from the shut capacitor until the voltage across the flashtube has decreased to a value at which the flashtube is extinguished and becomes non-conductive.

In a typical installation, a loop of several flash units is connected to a fire alarm control panel which includes a power supply for supplying power to all flash units in the loop when an alarm condition is present. The supply voltage may typically be 12 volts or 20–31 volts, and may be either D.C. supplied by a battery or a full-wave rectified voltage. Underwriters Laboratories specifications require that operation of the device must continue when the supply voltage drops to as much as 80% of nominal value and also when it rises to 110% of nominal value. The power supply typically is provided from first and second terminals which will normally have negative and positive polarity, respectively, when no alarm condition is present, and which reverse when an alarm condition is present, as is usual in supervised systems. When an alarm condition is present, power is supplied to all of the strobe units connected in the loop, with each unit firing independently of the others at a rate determined by its respective charging and triggering circuits and satisfying UL specifications that the flash rate of such visual signalling devices must fall between 20 and 120 flashes per minute.

To counteract claims by epileptic groups that viewing multiple visual signalling devices each flashing at different points in time may trigger a seizure in susceptible individuals. Underwriters Laboratories may additionally require that such signalling systems be controlled in a manner to insure that an individual viewing multiple units could see effective flash rates no higher than 5 flashes per second. Thus, there is a need for controlling multiple self-timed visual signalling devices in a way which will insure that individuals viewing multiple units could see effective flash rates no higher than 5 flashes per second.

It is a primary object of the present invention to provide a circuit having these properties and which also will work with:

(a) both D.C. and full-wave power rectified supplies;

(b) all fire alarm control panels;

(c) mixed strobes (i.e., 110 candela and 15 candela); and (d) audio as well as visual signalling devices.

Another object of the invention is to provide a circuit having these properties which can be manufactured at relatively low cost.

Another object is to provide a control circuit which will not interfere with the supervision function of the alarm system, and which will be compatible with both constant power and constant current strobe circuits.

Still another object is to provide a control circuit for synchronizing flashing of multiple strobes which, in the event of its failure, will allow each of the individual strobes to flash at its own self-timed rate.

Another object of the invention is to provide such control circuit for synchronizing flashing of multiple strobes and having capability to limit the energy per flash of the associated strobe circuits to that required to meet mandated requirements.

SUMMARY OF THE INVENTION

In accordance with the invention, a control circuit is provided which causes multiple strobes connected in a common circuit or loop to flash at the same time, in synchronism, at a rate no higher than a predetermined rate, for example, 5 flashes per second. The control circuit, which may either be incorporated in the fire alarm control panel which controls the loop, or interposed between the fire alarm control panel and the loop of strobes, derives its power from the control panel in the same way as the strobes do: during supervision when the polarity of the power supply is reversed, it uses no power, but when an alarm condition is present it becomes powered and starts operating in a sync: node. When in the sync mode, once every flash cycle, typically at intervals of 2.9 seconds, the control circuit interrupts power to all of the strobes for a period of from 10 to 30 milliseconds, this being the signal which causes all of the strobes in the loop to flash. At the same time, this signal resets the internal timer of each flash unit to ready it for arrival of the next sync signal. In the event no sync signal arrives after an interval exceeding 2.9 seconds, each strobe unit will flash when its flash timer completes its cycle.

The synchronizing control circuit of the invention may be used in conjunction with a variety of strobe circuit designs, preferably having the following desirable properties: (a) an energy limiter operable over a predetermined voltage range in the sync mode; (b) a trigger circuit which is responsive to the sync signals; and (c) a resettable timer for recycling the strobe unit in a non-sync mode in case of lack of the sync signal.

BRIEF DESCRIPTION OF THE DRAWINGS

Other objects, features, and advantages of the invention will become apparent, and its construction and operation better understood, from reading the following detailed description with reference to the accompanying drawings, in which.

DESCRIPTION OF THE PREFERRED EMBODIMENT

Figure 1:
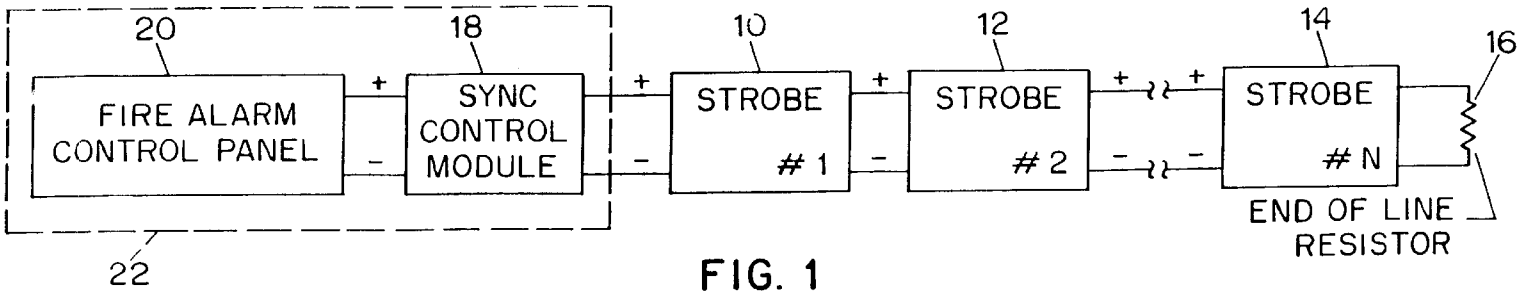
FIG. 1 is a block diagram of a synchronized strobe system according to the invention.

Referring to FIG. 1, multiple strobe circuits 10, 12 and 14 numbered from 1 to N, connected in a common loop and having the usual end of line resistor 16, are all caused to flash at the same time, in synchronism, by a sync control circuit 18. The sync control module 18 may either be incorporated in a conventional fire alarm control panel 20, as indicated by the doted line enclosure 22, or may be a free-standing unit interposed between the control panel and the first strobe circuit 10 of the loop. Sync control module 18 is energized from a D.C. power source embodied in control panel 20 in the same way that loop-connected strobes are usually energized in a supervised alarm system. During supervision, when the polarity of the power supply is reversed from that indicated in FIG. 1, module 18 uses no power (nor does it supply power to the strobes), but when an alarm condition is present the polarity of the voltage is as shown, which causes the control module to commence operation in a sync mode, which includes supplying D.C. power to the multiple strobes via a two-wire loop. The sync control module causes all of the strobes in the loop to cyclically flash in synchronism by periodically interrupting the supply of power to the strobes. Typically, the power is interrupted for a period of from 10 to 30 milliseconds, at intervals of 2.9 seconds, so as to cause all strobes to flash once about every 3 seconds. This flash rate satisfies the UL requirement of a minimum of one flash every three seconds and a maximum of three per second. This synchronizing signal, namely, the brief interruption in the supply voltage, in addition to triggering firing of the multiple strobes also resets the internal timer of each strobe unit to ready it for arrival of the next sync signal, and to enable it to self-fire in the event no synchronizing signal arrives after an interval exceeding 2.9 seconds following the last previous flash.

As will later be explained in detail, sync control circuit 18 is designed to synchronize flashing of multiple loop-connected strobes of various designs including, for example, modifications of the optocoupler strobe circuit described in U.S. Pat. No. 5,121,033 granted on Jun. 9, 1992 to applicant Kosich, and of the microprocessor-controlled strobe disclosed in applicants' U.S. patent application Ser. No. 08/061,965 filed May 14, 1993, and assigned to the same assignee as the present application. In order for the present sync circuit to work with a particular one of these strobe circuits, the strobe must be modified to include as a minimum the features and properties embodied in the basic strobe circuit depicted in FIG. 2, several of which may be connected in the loop of the system shown in FIG. 1. The flash unit 10 includes a flashtube DS1 shunted by a trigger circuit which includes a resistor R1 connected in series with the combination of a timer trigger 32 connected in parallel with the series combination of a capacitor C1 and the primary winding of an autotransformer T1. The secondary winding of the autotransformer is connected to the trigger band of the flashtube and when timer trigger 32 is fired capacitor C1 discharges through the autotransformer and produces a high voltage trigger pulse which, if the voltage across the flashtube, as determined by a capacitor C2 connected in parallel with the flashtube, exceeds its threshold firing voltage, causes the flashtube to conduct and quickly discharge capacitor C2.

Capacitor C2 is incrementally charged from a suitable D.C.-to-D.C. oscillator 34 through an inductor L1 which is connected to the positive terminal of capacitor C2 through a resistor R2 connected in series with a diode D2. The node between inductor L1 and resistor R2 is connected to ground through a switch Q1, which may be a MOSFET. The D.C.-to-D.C. oscillator 34 is connected across a D.C. voltage source, represented by $V_{in}$, and includes means for closing and opening switch Q1 for connecting and disconnecting inductor L1 across the D.C. source. Energy is stored in the inductor during closed periods of the switch and this stored energy is transferred from the inductor to capacitor C2 during open periods of the switch. The repetitive opening and closing of switch Q1, which may cycle at a frequency in the range from about 3,000 Hz to about 30,000 Hz, will eventually charge capacitor C2 to the firing threshold voltage of the flashtube.

Faced with the reality that the supply voltage to strobe alarms, even through typically D.C., may vary between wide limits, in order to meet UL specifications that the flash rate of the strobe must meet minimum requirements for the range of voltages for which the strobe is to operate, strobe circuits have heretofore been designed to expend the required energy for the lowest reasonably expected voltage. As a consequence, supply voltages greater than the lowest reasonably expected value would unnecessarily expend energy in the flash above the minimum, more often than needed and/or in a non-useful manner. For example, the capacitor C2 connected across the flashtube charges faster for higher input voltages; thus, if the flash is actuated when the potential across the capacitor attains the threshold firing voltage of the flashtube, the flash rate will increase, resulting not only in a waste of energy but also unnecessary wear and tear on the capacitor. In the case of the flashtube being triggered by a separate timing circuit, such as the timer trigger 32, a higher input voltage will cause overcharging of the storage capacitor, or at least make it necessary to provide a larger capacitor than should be necessary. As a result, the potential across the capacitor will cause a brighter than necessary flash, thereby wasting energy.

Figure 2:
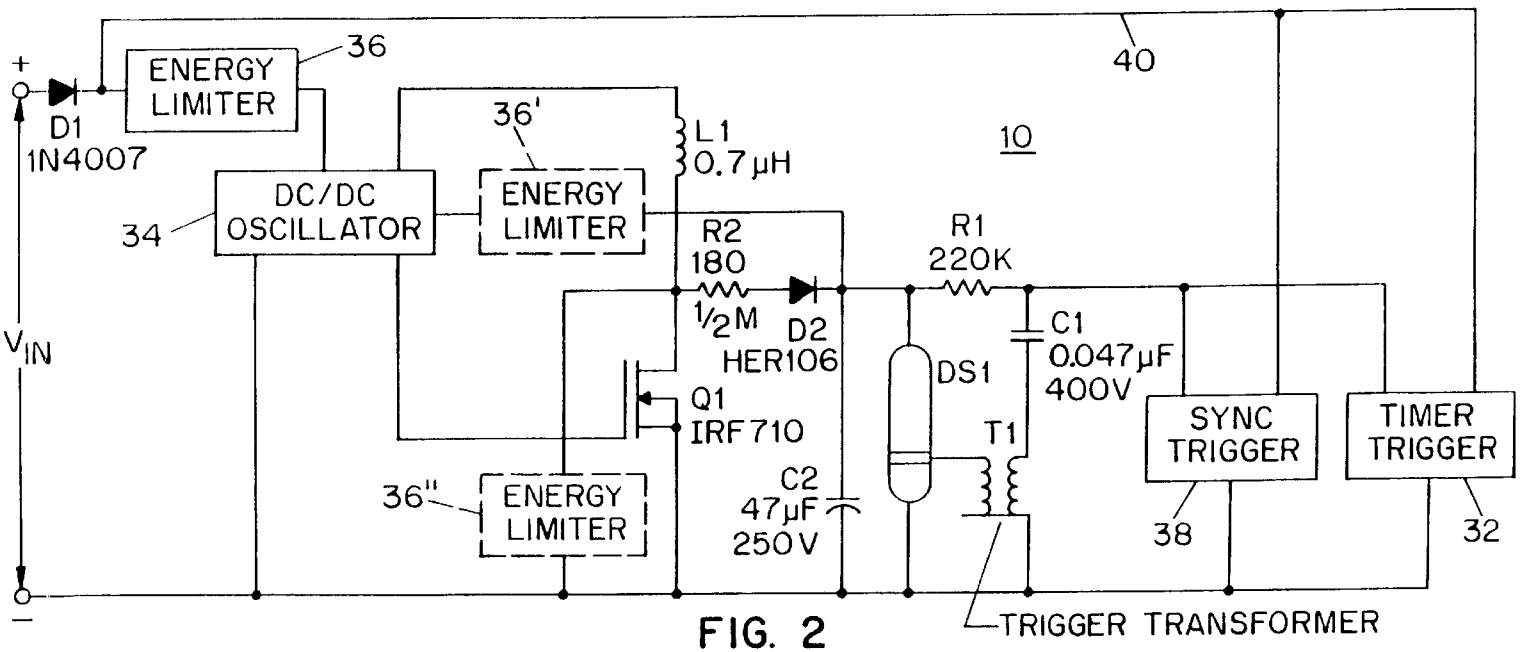
FIG. 2 is a circuit diagram, partially schematic and partially block, of a strobe circuit useful in describing the features of a strobe circuit essential to being fired synchronously with others.

In order to minimize unnecessary expenditure of energy, yet provide sufficient energy per flash at a constant frequency to meet minimum standards, the strobe circuit of FIG. 2 includes an energy limiter circuit which adjusts the amount of energy transferred to capacitor C2 responsively to changes in amplitude of the supply voltage. The energy limiter may take the form of a voltage regulator 36 connected in series with D.C.-to-D.C. oscillator 34 across the voltage source. Alternatively, it may be a voltage regulator 36' connected between oscillator 34 and the positive terminal of capacitor C3, or a voltage regulator 36" connected from the junction of inductor L1 and resistor R2 to the negative side of the voltage source.

In order that the strobe circuit of FIG. 2 be triggered by sync control module 18, a positive potential is normally supplied to a sync trigger circuit 38 via a conductor 40 connected to the positive terminal of the voltage source (which, it will be seen is a positive output terminal of sync control module 18). This potential also normally powers the internal timer trigger 32. Each time sync control module 18 briefly interrupts this voltage, timer trigger 34 is disabled and sync trigger 38 is enabled and triggers the firing of the flash unit.

Figure 3:
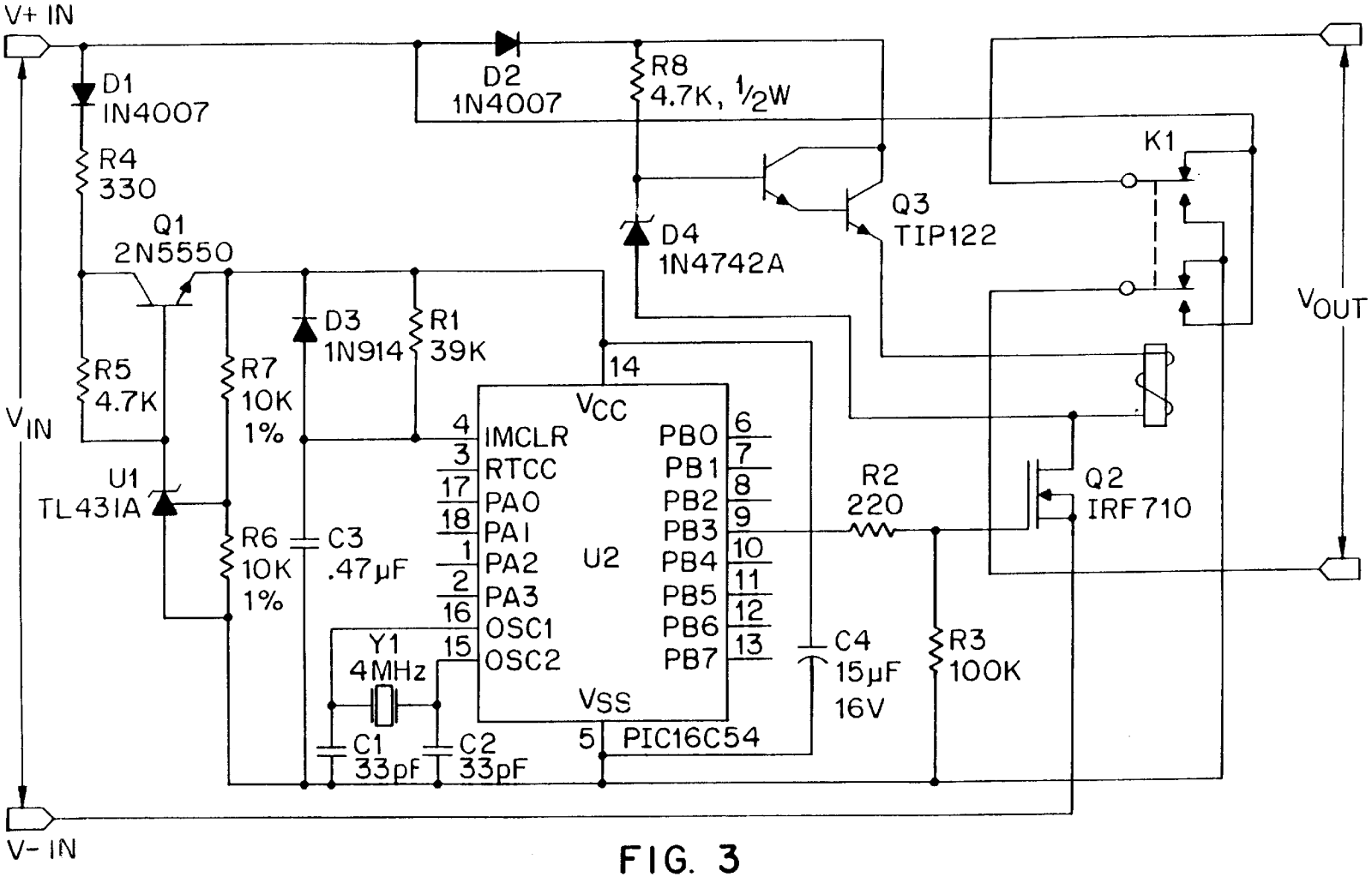
FIG. 3 is a circuit diagram of a strobe synchronizing controller according to the invention.

The preferred embodiment of the sync control circuit 18 shown in FIG. 3 is connected across a D.C. voltage source which supplies a voltage $V_{in}$. The supply voltage $V_{in}$ may have a wide range of values, from 20 volts to 31 volts, for example, in a nominally 24 volt system. The voltage is normally applied through a double pole double throw relay K1, shown in its normal position, to a pair of output terminals which supply a voltage $V_{out}$ to the input terminals of strobe units 10, 12, . . . . . N connected in the loop. That is to say, except when it is operating in a sync mode, the sync control circuit simply provides a direct connection from a D.C. voltage source, typically housed in the fire alarm control panel 20, to the loop connected strobes, so as to enable each of them to operate independently of the others at a flash rate determined by its internal timer.

The supply voltage $V_{in}$ is also applied through a diode D1, which typically has a voltage drop of 0.7 volt, to a regulator circuit which includes resistors R4, R5, R6 and R7, a transistor switch Q1 and an integrated circuit U1 connected as shown and having component values so as to provide a regulated 5.00±1% volt supply to the $V_{cc}$ input of a microcontroller U2. One terminal of resistor R4 is connected to the cathode of diode D1 and at the other terminal is connected to both resistor R5 and the collector of a switch Q1, which in this case is a transistor. The other terminal of resistor R5 is connected to the base electrode of switch Q1 and to an integrated circuit U1, which acts as a controlled Zener for providing a precise 5.00 volts supply. Resistor R7 is connected between the emitter of switch Q1 and the control pin of integrated circuit U1. Resistor R6 is connected at one end to both resistor R6 and the control pin of integrated circuit U1 and at the other end to one end of U1, which is connected to the negative side of the voltage source. Resistors R6 and R7 are of equal value for biasing integrated circuit U1. A reset circuit for microcontroller U2 includes a diode D3, a resistor R1 and a capacitor C3. Diode D3 and resistor R1 are connected to each other in parallel, the cathode of diode D3 being connected to the emitter of switch Q1 and its anode being connected to both the positive terminal of a capacitor C3 and the "CLEAR" input to microcontroller U2. The other terminal of capacitor C3 is connected to the negative side of the voltage source.

As noted earlier, a regulated potential of 5.00 volts is applied at $V_{cc}$ of microcontroller U2; its $V_{ss}$ terminal is connected to the negative side of the voltage source. A capacitor C4 connected across $V_{cc}$ and $V_{ss}$ acts as a filter. A resonator circuit 94 consisting of an oscillator Y1 and capacitors C1 and C2 is connected across the two oscillator inputs of, and supplies 4 MHz oscillations to, microcontroller U2. Capacitors C1 and C2 are respectively connected between the first and second oscillator inputs of the microcontroller and the negative side of the voltage source.

Before describing the function of the microcontroller U2, the components of the circuit affected thereby will be described. Connected across $V_{in}$ is a branch consisting of a diode D2, having a voltage drop of approximately 0.7 volt, a switch Q3, in this embodiment a Darlington transistor pair, the coil of relay K1 and a switch Q2, which in this embodiment is a MOSFET. The voltage applied to the base electrode of one transistor of the Darlington pair is regulated by a resistor R8 and a Zener diode D4 series-connected in that order between the cathode of diode D2 and the end of the coil of relay K1 that is connected to switch Q2.

Switch Q2 is cycled between a conducting state and a nonconducting state by an output of microcontroller U2 which is applied to the gate of switch Q2 via a voltage divider including a resistor R2 connected from the output (Pin 9) of microcontroller U2 to the gate, and a resistor R3 connected from the gate electrode to the negative side of the power source. When switch Q2 is closed, the potential at the output emitter of switch Q3 is pulled to that of the negative side of the source, causing switch Q3 to conduct and thereby cause current to flow through the coil of relay K1 and switch the relay from its normal position to the other set of contacts. Actuation of the relay reverses the polarity of $V_{out}$, which amounts to interrupting the positive D.C. voltage normally supplied to the controlled strobe units. When switch Q2 is opened, switch Q3 stops conducting, the relay is deenergized and $V_{out}$ is returned to its original polarity. By controlling the opening and closing of switch Q2, the rate at which the voltage supplied to the strobes is interrupted, and for how long, is regulated.

Figure 4:
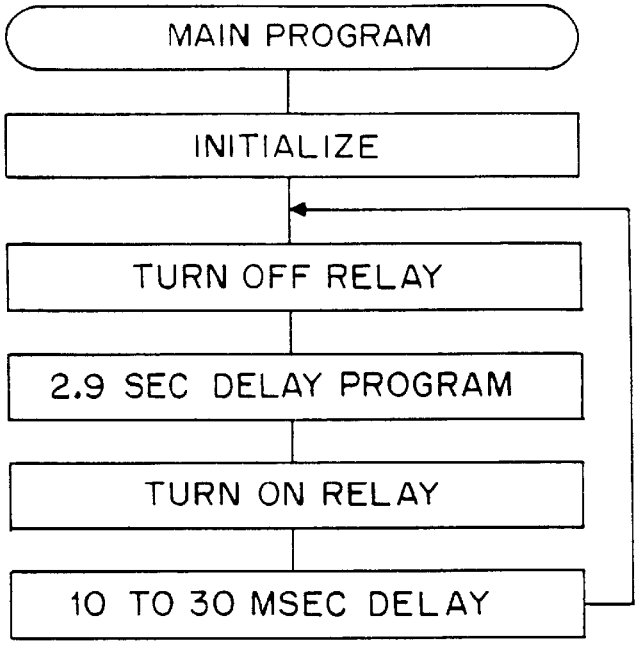
FIG. 4 is a flow chart of the functions of the strobe synchronizing controller of FIG. 3.

The real time clock and prescaler of microcontroller U2, which in this embodiment is a PIC16C71 microcontroller having 8-bit resolution, are used to produce signals for accurately controlling the ON time of switch Q2. Typically, the real time clock and prescaler routine produce pulses at Pin 9 which cause switch Q2 to be ON, and therefore interrupt power to the strobes, for a period of from 10 to 30 milliseconds, and to be OFF or open for 2.9 seconds. As illustrated by the simplified flow chart of FIG. 4, upon initialization by the main microcontroller program, switch Q2 is open and relay K1 is in the condition shown in FIG. 3. Following a delay of 2.9 seconds, the desired flash cycle of the controlled strobes, switch Q2 is closed and switch Q3 conducts and energizes relay K1 for a period of 10 to 30 milliseconds, following which the relay is again turned off and the process is repeated. If for any reason microcontroller U2 should fail to deliver a pulse to switch Q2 2.9 seconds later, the relay will remain OFF and D.C. power will be supplied to the individual controlled strobes, allowing each to operate independently under control of its internal timing trigger.

By way of example, the circuit shown in FIG. 3, when energized from a 24 volt DC power source, may use the following parameters to obtain the desired switching cycle:

| ELEMENT | VALUE OR NO. |
|---|---|
| C1, C2 | CAP., 33 pF, 200 V |
| C3 | CAP., 47 μF |
| C4 | CAP., 15 μF, 16 V |
| D1, D2 | DIODE, 1N4007 |
| D3 | DIODE, 1N914 |
| D4 | DIODE, 1N4742A |

-continued

| ELEMENT | VALUE OR NO. |
|---|---|
| Q1 | TRANSISTOR, 2N5550 |
| Q2 | TRANSISTOR, IRF710 |
| Q3 | TRANSISTOR TIP122 |
| R1 | RES., 39 K, 1 W, 5% |
| R2 | RES., 220, 1 W, 5% |
| R3 | RES., 100 K, 1 W, 5% |
| R4 | RES., 330, 1 W, 5% |
| R5 | RES., 4.7 K, 1 W, 5% |
| R6, R7 | RES., 10 K, 1 W, 1% |
| R8 | RES., 4.7, 1 W, 5% 4.7 K |
| U1 | LC., TL431A |
| K1 | RELAY, DPDT |
| U2 | LC., PIC16C34 |
| Y1 | CERAMIC RES., 4 MHZ |

As discussed earlier, sync control circuit 18 (FIG. 3) is designed to synchronize flashing of strobes of various designs, including an optocoupler strobe circuit of the type described in U.S. Pat. No. 5,121,033, provided it has the features depicted in FIG. 2. A currently preferred modification of the patented optocoupler strobe, shown in FIG. 5, differs from the patented circuit in the respects that it includes means for limiting the energy expended; a sync trigger circuit; and, a re-settable internal trigger to enable it to self-fire in the event the sync control circuit fails to deliver a sync pulse at the appropriate time. A storage capacitor C1 connected in parallel with the flashtube is incrementally charged from an inductor L1 which is connected to the positive terminal of the capacitor through a resistor R3 connected in series with a diode D2. The rate at which increments of energy are transferred from inductor L1 to capacitor C1 is determined by an optocoupler circuit which includes a resistor R2 connected in series with inductor L1. When a switch Q1 is closed and connects the inductor across the D.C. voltage source, $V_{in}$, the voltage developed across resistor R2 is indicative of the magnitude of the current flowing through inductor L1. Opening of switch Q1 is controlled by an optocoupler U1 consisting of a light-emitting diode optically coupled to a phototransistor detector. The voltage at the collector electrode of the transistor portion of the optocoupler, and at the base electrode of switch Q1, is established by a voltage divider consisting of a resistor R8 and a Zener diode Z2 connected in series across the D.C. supply, a capacitor C4 connected in parallel with diode Z2 and a resistor R1 connected from the junction of resistor R8 and diode Z2 to the aforesaid transistor collector electrode and to the base electrode of switch Q1. The diode Z2 protects switch Q1 against over-voltage and provides the regulated voltage required for the timing circuit. The capacitor C4 filters the regulated voltage, and is particularly needed when the D.C. source is a full-wave rectified supply.

As power is initially supplied to the circuit (that is, during the 2.9 seconds periods between sync signals from the sync control circuit) the LED and transistor of optocoupler U1 are both "off" and switch Q1 quickly turns "on" and connects inductor L1 across the D.C. source. Closing of switch Q1 initiates charging of the inductor L1 and a buildup of current through an isolating diode D1 and resistor R2. When the current flowing through inductor L1 attains a value sufficient to develop a voltage across resistor R2 of approximately 1.2 volts, the conduction threshold voltage of the LED portion of the optocoupler, the diode is turned "on" and illuminates the transistor portion to turn it "on" which, in turn, causes switch Q1 to be turned "off" thereby to disconnect inductor L1 from across the D.C. source. During the open "off" period of switch Q1, energy stored in inductor L1 is transferred through resistor R3 and diode D2 to capacitor C1. Upon cessation of current flow through resistor R2 due to opening of switch Q1, the voltage drop across resistor R2 is no longer sufficient to keep the LED "on", the transistor stops conducting, switch Q1 is again turned "on" and the cycle is repeated.

The "on" and "off" periods of switch Q1 are determined by the switching characteristics of optocoupler U1, the values of resistors R1, R2, R8 and Zener diode Z2, the values of inductor L1 and the voltage of the D.C. source, and may be designed to cycle at a frequency in the range from about 3000 Hz to about 30,000 Hz. The repetitive opening and closing of switch Q1 eventually charges capacitor C1 to the point at which the voltage across it attains a threshold value required to fire the flashtube. Overcharging of capacitor C1 by a higher than designed source voltage is prevented by a resistor R5 and a Zener diode Z1 connected in series between the base electrode of the optocoupler transistor and the positive electrode of storage capacitor 12. The values of these components are chosen so that when the voltage across capacitor C1 attains the firing threshold voltage of the flashtube, a positive potential is applied to the base electrode of the optocoupler transistor and turns "on" the transistor which, in turn, turns switch Q1 "off" and disconnects inductor L1 from across the D.C. source.

The timer trigger circuit of the flash unit includes a resistor R4 connected in series with the combination of a switch Q3, which is this embodiment is an SCR, connected in parallel with the series combination of a capacitor C2 and the primary winding of an autotransformer T1, the secondary winding of which is connected to the trigger band of the flashtube. When the voltage across the flashtube exceeds its threshold firing voltage, switch Q3 conducts and the charge on capacitor C2 flows through the primary of transformer T1, inducing a high voltage pulse in its secondary and causing the flashtube to conduct. As previously mentioned, the flashtube quickly discharges the energy stored in capacitor C1, readying it to be recharged from the inductor L1 through diode D2.

Figure 5:
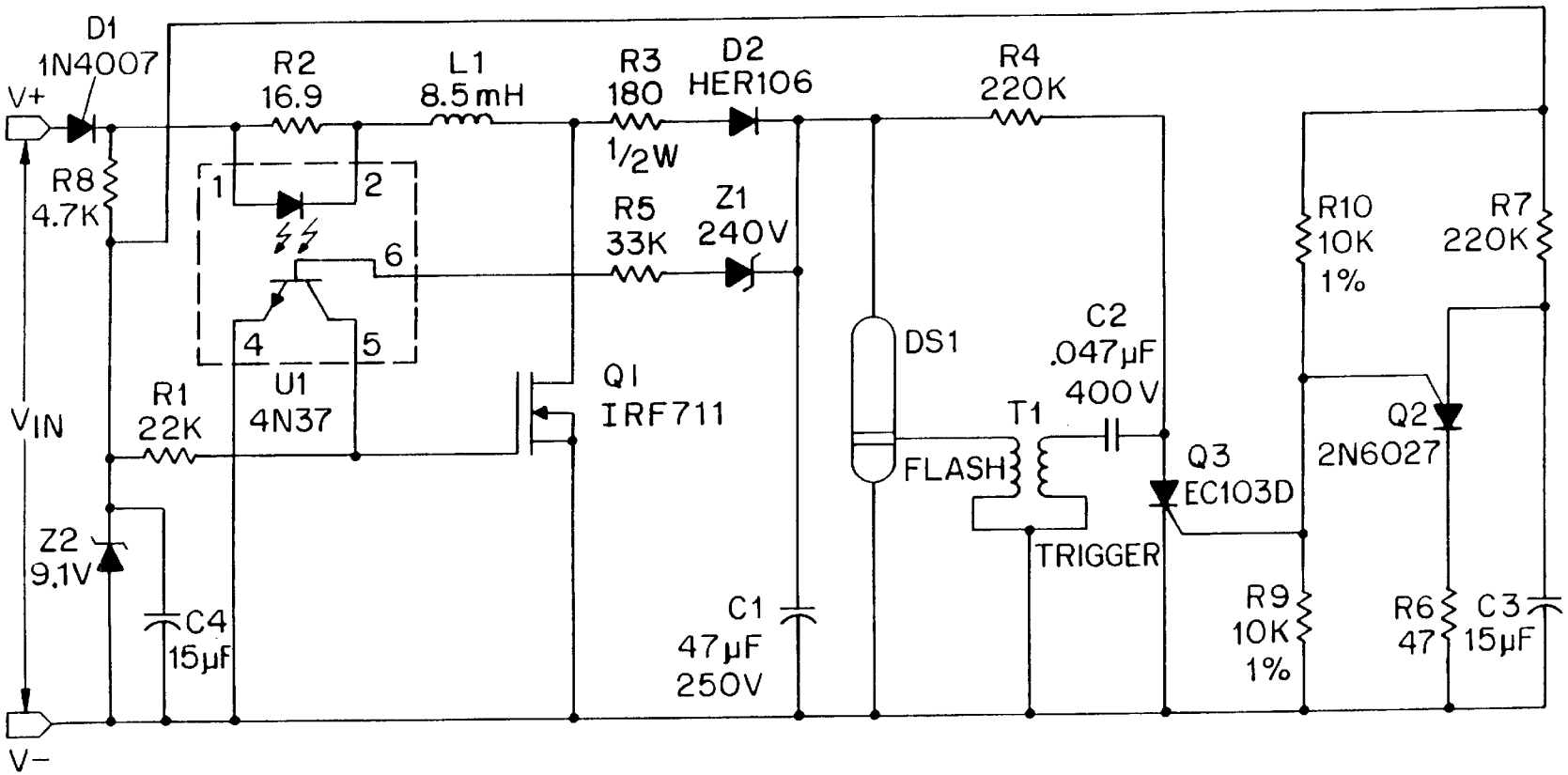
FIG. 5 is a circuit diagram of a first embodiment an optocoupler strobe useful in the system of FIG. 1.

The strobe circuit of FIG. 5 is triggered by the sync control module 18, to the exclusion of the just-described timer trigger, by a sync trigger circuit which includes a resistor R7 and a capacitor C3 connected in series in that order between the junction of resistor R8 and diode Z2 and the negative side of the power source. A switch Q2, which in this embodiment is a programmable unijunction transistor, is connected in series with a resistor R6 across capacitor C3, and a voltage divider consisting of series-connected resistors R9 and R10 is connected in parallel with the series combination of resistor R7 and capacitor C3. The junction of resistors R9 and R10 is connected to the gate electrode of the PUT, and the positive terminal of resistor R6 is connected to the gate electrode of the SCR Q3.

When the regulated voltage supplied to the sync trigger circuit is interrupted by operation of sync control module 18, the previously charged capacitor C3 discharges through resistor R7, and when the voltage on capacitor C3 reaches a predetermined level as determined by the characteristics of switch Q2 and the resistance values of resistors R9 and R10, switch Q2 is turned "on" which, in turn, turns SCR Q3 "on" to fire the flashtube. Shortly after the flashtube fires, the short interruption period of the applied potential terminates, and a positive potential is again applied to diode D1 thereby to ready the circuit for arrival of the next sync pulse. In this embodiment, resistors R9 and R10 are external to switch Q2, enabling better tolerance control over their values than when these resistors are internal to switch Q2 as is the case in the modified circuit shown in FIG. 6, which in all other respects is identical to the circuit of FIG. 5. In the FIG. 6 switch Q2 is not a PUT but, instead, is a unijunction transistor having two internal resistors corresponding to resistors R9 and R10. Thus, the modification shown in FIG. 6 has two fewer parts then the FIG. 5 circuit, at the possible expense of less tolerance control.

Figure 6:
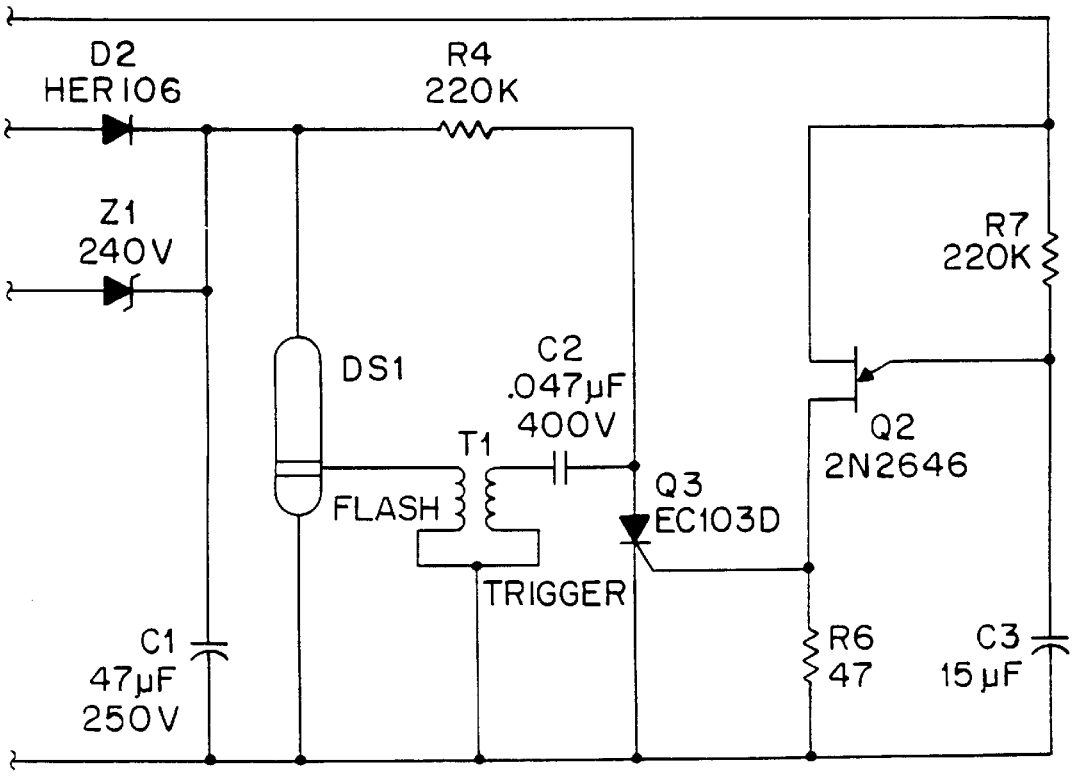
FIG. 6 is a diagram which illustrates a modification of the circuit of FIG. 5.

By way of example, the circuit illustrated in FIG. 5, and the modification thereof shown in FIG. 6, when energized from a 24 volt D.C. power source, may use the following parameters for the circuit elements:

| ELEMENTS | VALUE OR NO. |
|---|---|
| C1 | CAP., 47 μF, 250 V |
| C2 | CAP., .047 μF, 400 V |
| C3 | CAP., 15 μF, 5% |
| C4 | CAP., 15 μF, 5% |
| D1 | DIODE, 1N4007 |
| D2 | DIODE, HER106 |
| L1 | INDUCTOR, 8.5 mH |
| Z1 | DIODE, 240 V. |
| Z2 | DIODE, 9.1 V., 5% |
| Q1 | TRANSISTOR, IRF710 |
| Q2 | PUT 2N6027 (FIG. 5); UJT 2N2646 (FIG. 6) |
| T1 | TRIGGER TRANSFORMER |
| DS1 | FLASHTUBE |
| Q3 | SCR, EC103D |
| R1 | RES., 22 K, 1 W |
| R2 | RES., 16.9 |
| R3 | RES., 180, 1 W |
| R4 | RES., 220 K |
| R5 | RES., 33 K |
| R6 | RES., 47 |
| R7 | RES., 220 K |
| R8 | RES., 4.7 K |
| R9, R10 | RES., 10 K, 1% |
| U1 | OPTOCOUPLER, 4N37 |

Figure 7:
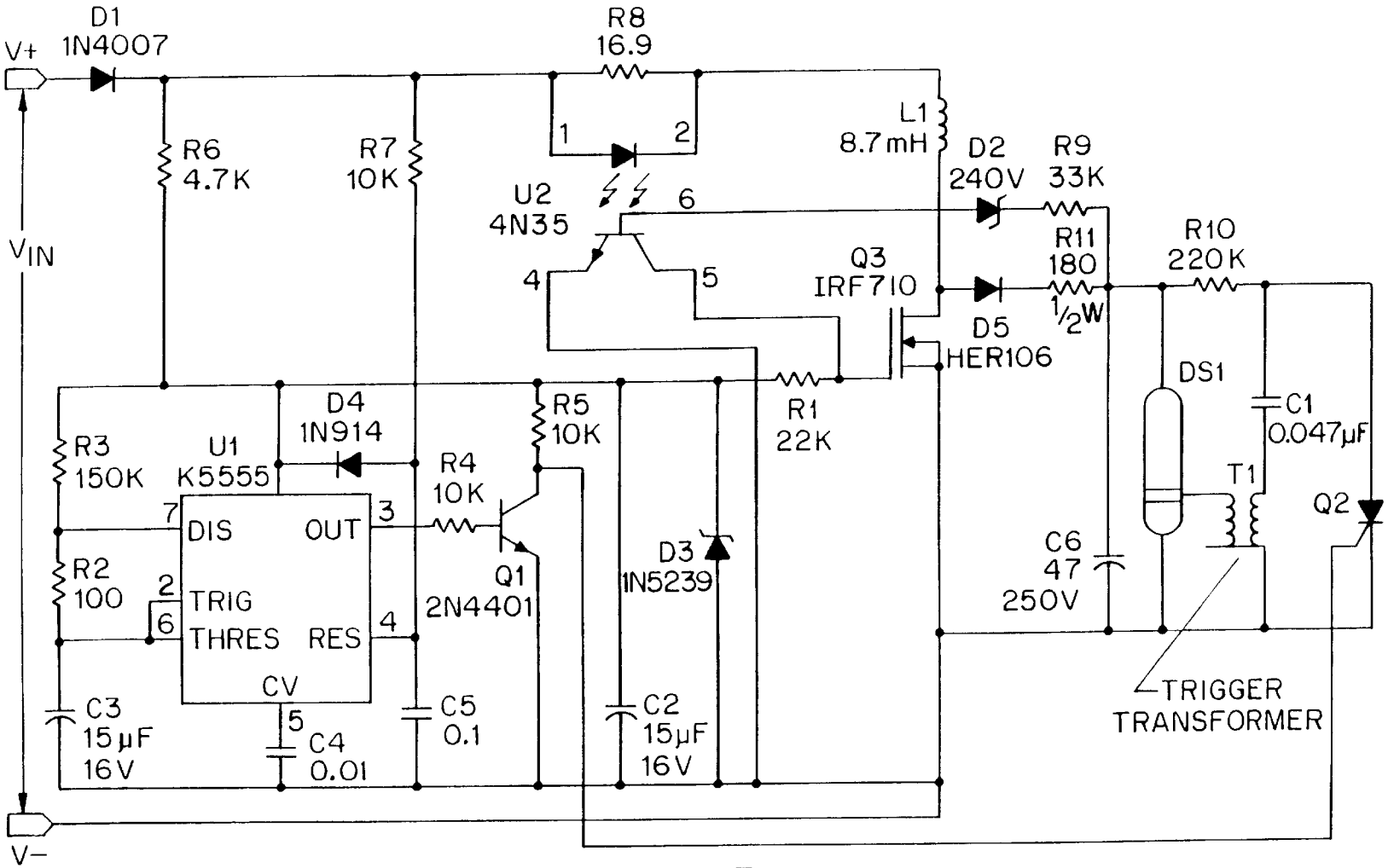
FIG. 7 is a circuit diagram of a third embodiment of an optocoupler strobe circuit wherein flashing of the strobe is controlled by a timer.

FIG. 7 is a circuit diagram of another strobe circuit utilizing an optocoupler for D.C.-to-D.C. conversion in which a combination of a CMOS timer and an SCR is used to control firing and triggering of the flashtube in both the synchronous and non-synchronous modes of operation. Briefly, a capacitor C6 connected in parallel with the flashtube is incrementally charged through a diode D5 and a resistor R11 from an inductor L1, which is cyclically connected and disconnected across a D.C. supply by a switch Q3 controlled by an optocoupler U2. A Zener diode D2 and a resistor R9 series-connected between the base electrode of the transistor of the optocoupler and the positive terminal of capacitor C6 shuts off the D.C./D.C. oscillator when the capacitor is charged to maximum capacity, thereby limiting the energy supplied to the flashtube to only what is necessary. The trigger circuit for the flashtube includes a resistor R10 connected in series with the combination of a switch Q2, which in this embodiment is an SCR, connected in parallel with the series combination of a capacitor C1 and the primary winding of an autotransformer T1, the secondary of which is connected to the trigger band of the flashtube. When switch Q2 is turned "on" in a manner to be described presently, capacitor C1 discharges through the primary of transformer T1 and induces a high voltage in the secondary winding which, if the voltage on capacitor C6 equals the threshold firing voltage of the tube, causes the flashtube to conduct and quickly discharge capacitor C6.

In this embodiment, switch Q2 is turned "on" in both the synchronous and self-timed modes of operation by an integrated circuit timer U1 which, in this embodiment is a KS555 timer. The KS555 is a stable timer capable of producing accurate time delays or frequencies, which for stable operation as an oscillator, as here used, the free-running frequency and the duty cycle are both accurately controlled by two resistors R3 and R2 and a capacitor C3 connected in series in that order between the junction of a resistor R6 connected in series with a Zener diode D3 and the negative side of the D.C. supply. The Zener D3 regulates the voltage applied to the $V_{cc}$ terminal of the timer and to the junction between resistors R6 and R3. The "THRES" and "TRIG" terminals of the timer are connected to the junction between resistor R2 and capacitor C3 and the DISCHARGE terminal is connected to the junction of resistors R3 and R2. The RESET terminal is connected to the junction between a resistor R7 and a capacitor C5 connected in series across the D.C. supply, and the OUTPUT terminal is connected to the base electrode of a switch Q1, which in this embodiment is a transistor. The junction between resistor R7 and capacitor C5 is also connected via a diode D4 to the $V_{cc}$ terminal.

In this embodiment, resistors R2 and R3 have resistance values of 100 ohms and 150 K ohms, respectively, and capacitor C3 has a value of 15 μF. When operating in the non-synchronous (i.e., self-timed) mode, capacitor C3 is charged through resistors R3 and R2 until it has charged to 2/3 V of the Zener voltage of diode D3. During charging, the "OUT" Pin 3 of the timer is high, causing transistor Q1 to conduct which, in turn, by reason of a connection from its collector electrode to the gate electrode of SCR Q2, turns the latter "Off". Once capacitor C3 has charged to 2/3 V, the voltage at Pin 7 causes Pin 3 to go low, which initiates a discharge cycle. Capacitor C3 discharges through resistor R2 only until its voltage reaches ⅓ of the voltage on D3, which because of the small resistance of R2 occurs in a very brief time period. During this brief period, switch Q1 is turned "off" and applies a pulse to switch Q2 to turn it "on" and the flashtube is fired The timer provides greater control over the flash rate in the non-synchronous mode than does the circuit shown in FIGS. 5, potentially at less than 3 seconds intervals.

When operating in the synchronous mode, the timer U2 is in its charging or "on" state; when a sync pulse arrives the D.C. power is interrupted by Pin 4 (RESET) of the timer being pulled to ground through the action of the series-connected resistor R7 and capacitor C5, the potential at the junction of which is coupled to Pin 4 (RESET) and also through diode D4 to the $V_{cc}$ terminal of the timer. Grounding of Pin 4 resets the timer, turning switch Q1 "off" which, in turn, turns switch Q2 "on" to fire the flashtube. Upon termination of the sync signal, which it will be recalled has a period in the range from 10 to 30 milliseconds, capacitor C3 is again charged through resistors R6, R3 and R2 to ready the timer for arrival of the next sync signal. In case a sync signal does not arrive 2.9 seconds later the timer will automatically go into the described non-synchronous self-timed mode.

By way of example, the following parameters may be used for the components of the FIG. 7 circuit, having a $V_{in}$ of 24 V D.C., to obtain the indicated flash frequencies:

| ELEMENT | VALUE OR NO. |
|---|---|
| C1 | CAP., 0.047 μF, 400 V |
| C2, C3 | CAP., 15 μF, 16 V |

-continued

| ELEMENT | VALUE OR NO. |
|---|---|
| C4 | CAP., 0.01 μF |
| C5 | CAP., 0.1 μF |
| C6 | CAP., 47 μF, 250 V |
| D1 | DIODE, 1N4007 |
| D2 | ZENER DIODE, 240 V |
| D3 | ZENER DIODE, 1N5239 |
| D4 | DIODE 1N914 |
| D5 | DIODE HER106 |
| Q1 | TRANSISTOR, 2N4401 |
| Q2 | SCR, 7 |
| Q3 | TRANSISTOR, IRF710 |
| L1 | INDUCTOR 8.7 mH |
| R1 | RES., 22 k |
| R2 | RES., 100 |
| R3 | RES., 150 K |
| R4, R5 | RES., 10 K |
| R6 | RES., 4.7 K |
| R7 | RES., 10 K |
| R8 | RES., 16.9 |
| R9 | RES., 33 K |
| R10 | RES., 220 K, 1 W |
| R11 | RES., 180, 1 W |
| U1 | TIMER, KS555 |
| U2 | OPTCOUPLER, 4N35 |

Figure 8:
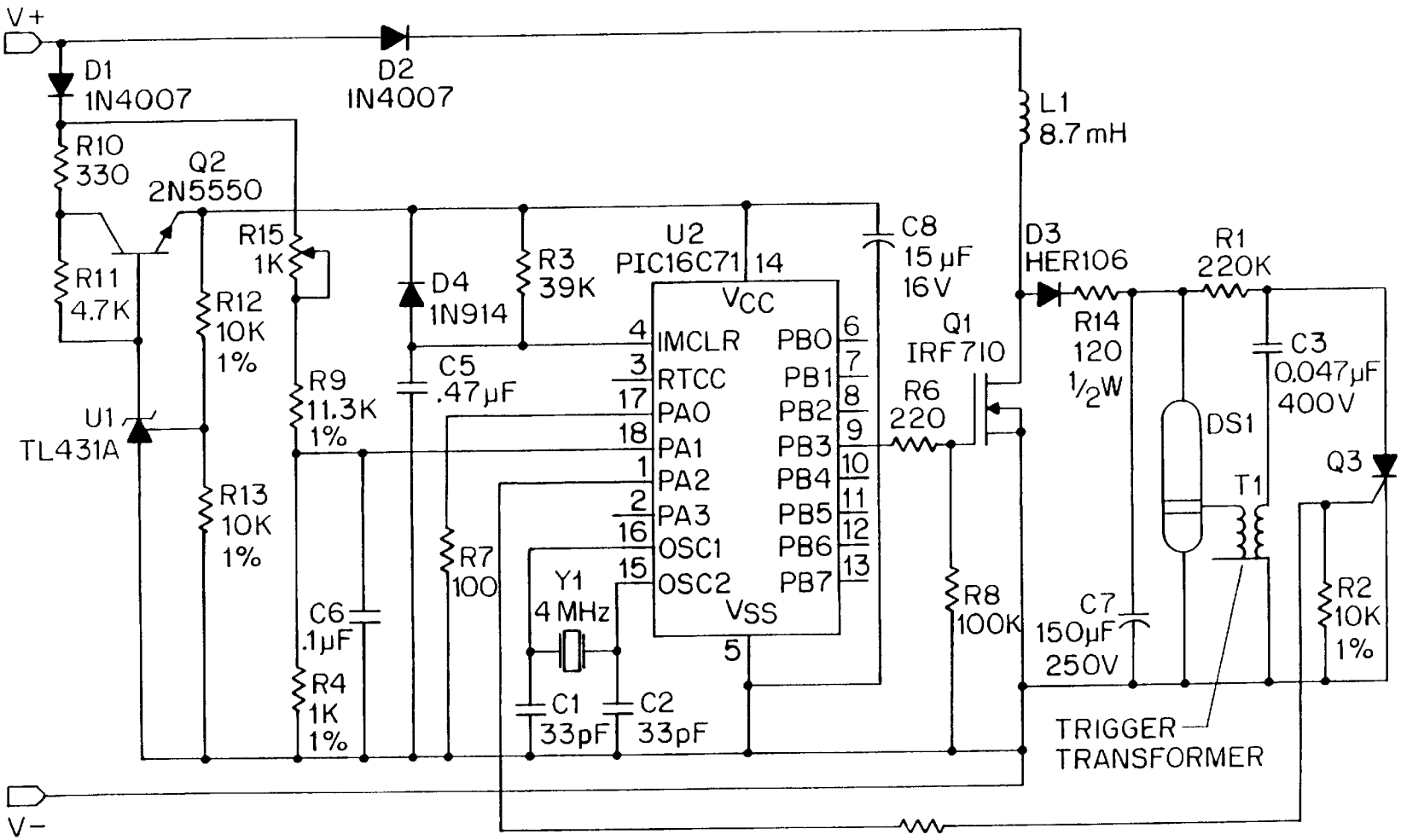
FIG. 8 is a circuit diagram of a microprocessor-controlled strobe useful in the system of FIG. 1.

FIG. 8 is a circuit diagram of a microcontroller strobe circuit similar to that disclosed and claimed in applicants' copending application Ser. No. 08/061,965 filed May 14, 1993, the flashing of which also may be synchronized by the sync control circuit 18 of FIG. 3. The circuit is connected across the D.C. voltage source, supplied via the sync control circuit 18 as previously described, having a voltage $V_{in}$. The voltage is applied through a diode D1, which typically has a voltage drop of 0.7 volt, to a regulator which includes resistors R10, R11, R12 and R13, a switch Q2 and an integrated circuit U1 for providing a regulated 5.00±1% volts input to the $V_{cc}$ terminal of a microcontroller U2. A precise $V_{cc}$ input voltage is vital for the analog-to-digital reference input of microcontroller U2. Resistors R10 and R11 are connected in series between the cathode of diode D1 and the base electrode of switch Q1, which in this case is a transistor, and also to the cathode of integrated circuit U1, which acts as a controlled Zener for providing 5.00 volts±1%. Resistors R12 and R13 are connected in series between the emitter of transistor Q2 and the negative side of the voltage source, and their junction is connected to the control electrode of integrated circuit U1. Resistors R12 and R13 are of equal value for biasing integrated circuit U1.

A reset circuit includes a diode D4, and a capacitor C5 connected in series between the emitter electrode of switch Q2 and the negative side of the D.C. source, and a resistor R3 connected in parallel with diode D4. The junction between diode D4 and capacitor C5 is connected to the "CLEAR" terminal of microcontroller U2. As stated above, microcontroller U2 is supplied with a regulated 5 volt supply at $V_{cc}$; the $V_{ss}$ terminal is connected to the negative side of the source. A capacitor C8 connected across $V_{cc}$ and $V_{ss}$ acts as a filter. A resistor R7 connected between one of the analog-to-digital input terminals (PAO, Pin 17) of microcontroller U2 and the negative side of the source acts as a shield for the controller. Oscillations at a frequency of 4 MHz are applied to terminals OSC1 and OSC2 of the microcontroller by a resonator circuit consisting of an oscillator Y1 and a pair of capacitors C1 and C2 connected between the negative side of the source and the first and second oscillator inputs, respectively.

A voltage level proportional to the supply voltage, $V_{in}$, is supplied to a different analog-to-digital input terminal of the microcontroller, for example, the PA1 terminal (Pin 18) by a voltage divider network consisting of a potentiometer R15, a resistor R9 and a resistor R4 connected in series between the junction of diode D1 and resistor R10 and the negative side of the D.C. source, and a capacitor C6 connected in parallel with resistor R4. The voltage developed at the junction between resistors R9 and R4, which may be fine-tuned by the potentiometer R15, is applied to the PA1 terminal.

The microcontroller U2 controls the opening and closing of a switch Q1, which in this embodiment is a MOSFET, by coupling a signal developed at an output terminal PB3 (Pin 9) via a voltage divider consisting of resistors R6 and R8 to the gate electrode of switch Q1. Switch Q1 is connected in series with an inductor L1 and a diode D2, and when closed connects the inductor across the voltage source, $V_{in}$. With switch Q1 closed, inductor L1 stores energy until a steady state level is reached, or the switch is opened. When switch Q1 is opened, the energy stored in inductor L1 is at least partially transferred through a diode D3 and a resistor R14 to a storage capacitor C7 connected in parallel with a flashtube. By controlling the opening and closing of switch Q1, the rate at which energy is stored in inductor L1 is regulated, thereby regulating the energy transferred to storage capacitor C7. Diode D3 permits current flow into the flash unit but prevents discharge of capacitor C7 when the potential across it is higher than $V_{in}$ or the potential across inductor L1. The flashtube is shunted by a trigger circuit which includes a resistor R1 connected in series with the combination of a switch Q3, which in this embodiment is an SCR, connected in parallel with the series combination of a capacitor C3 and the primary winding of an autotransformer, the secondary winding of which is connected to the trigger band of the flashtube. When, at the appropriate time, a signal produced at the PA2 output of microcontroller U2 is applied via a resistor R5 to the gate of the SCR (Q3), the SCR is fired and causes capacitor C3 to discharge through the primary winding of the transformer, inducing a high voltage pulse in the secondary winding which ionizes the gas in the flashtube and causes it to flash, provided the voltage thereacross equals or exceeds the threshold firing voltage. A resistor R2 connected between the gate electrode of the SCR and the negative side of the D.C. supply isolates the SCR from noise.

Microcontroller U2, which in this embodiment is a PIC16C71 microcontroller having a built-in analog-to-digital converter with 8-bit resolution, uses the A/D converter to arrive at a digital equivalent of the supply voltage and then uses this digitized information to control the opening and closing of switch Q1, and thus the charging of inductor L1 and the transfer of energy from the inductor to capacitor C7, so that the output PA2 triggers switch Q3 to fire the flashtube at the same time that the potential across the capacitor C7 has attained the desired value. More particularly, the A/D converter measures the supply voltage in 256 steps of approximately ¼ volt each. The microcontroller program U2 equates each step with a location in a look up table. One conversion or measurement is made for each cycle of the switch Q1, a new value being read from the lookup table each time. These values control the ON time of switch Q2. The ON time for each value in the lookup table is empirically derived; for low voltages, the ON time is long, and for high voltages, the ON time is shorter, whereby the energy stored throughout a flash cycle is kept somewhat constant.

The switching frequency of switch Q1 is in the range of approximately 3 kHz to 30 kHz and has a high duty cycle (roughly 50% to 90%). Each value in the lookup table equates to a switching frequency for ensuring that switch Q2 will be ON for sufficient time to charge capacitor C7 to the precise amount needed for the minimum required intensity of once per three seconds flash, for example. The high duty cycle results in storing of the energy in inductor L1 for most of the three seconds interval between flashes. This means that peak currents are lower than if the routine utilized a low duty cycle in which inductor L1 was charged for a relatively shorter period during each flash cycle.

If the supply voltage sensed is below a minimum (e.g., less than 13 volts, below which it may be impossible to obtain the precise 5.00 volts±1%) microcontroller U2 turns switch Q1 OFF and waits for the level to rise above the preset start up voltage (e.g., 14 volts).

Microcontroller U2 has an interrupt, a real time clock and a prescaler which are used to produce an accurate, one per three seconds flash rate. The real time clock and prescaler generate a one-fifteenth of a second interrupt. The interrupt service routine then counts these pulses. When fifteen pulses have occurred, a pulse is sent to the SCR Q3 and the flashtube is triggered. The interrupt routine additionally controls the variable OFF time function. The OFF time of switch Q1 is programmed to be a different predetermined value dependent on the number of cycles completed in the fifteen hertz rate of the interrupt (i.e., dependent on the time since the last flash). A high value of OFF time is used after a trigger event, followed by several progressively lower values. This helps to minimize current anomalies during and immediately after a flash.

By way of example, the following parameters may be used for the elements of the FIG. 8 circuit to obtain a flash frequency of one flash per three seconds:

| ELEMENT | VALUE OR NO. |
|---|---|
| C1, C2 | CAP., 33 pF, 200 V |
| C3 | CAP., .047 μF, 400 V |
| C5 | CAP., 47 μF |
| C6 | CAP., 1 μF |
| C7 | CAP., 150 μF, 250 V. |
| C8 | CAP., 15 μF, 16 V |
| D1, D2 | DIODE 1N4007 |
| D3 | DIODE HER106 |
| D4 | DIODE 1N914 |
| L1 | INDUCTOR, 8.7 mH |
| Q1 | TRANSISTOR, IRF740 |
| Q2 | TRANSISTOR, 2N5550 |
| Q3 | SCR. EC103D |
| R1 | RES., 220 K |
| R2 | RES., 10 K |
| R3 | RES., 39 K |
| R4, R5 | RES., 1 K |
| R6 | RES., 220 |
| R7 | RES., 100 |
| R8 | RES., 100 K |
| R9 | RES., 11.3 K |
| R10 | RES., 330 |
| R11 | RES., 4.7 K |
| R12, R13 | RES., 10 K |
| R14 | RES., 120 |
| R15 | POT., 1 K |
| T1 | TRANSFORMER, TRIGGER |
| U1 | LC., TL431A |
| U2 | LC., PIC16C71 |
| Y1 | CERAMIC RES., 4 MHz |

Figure 9A:
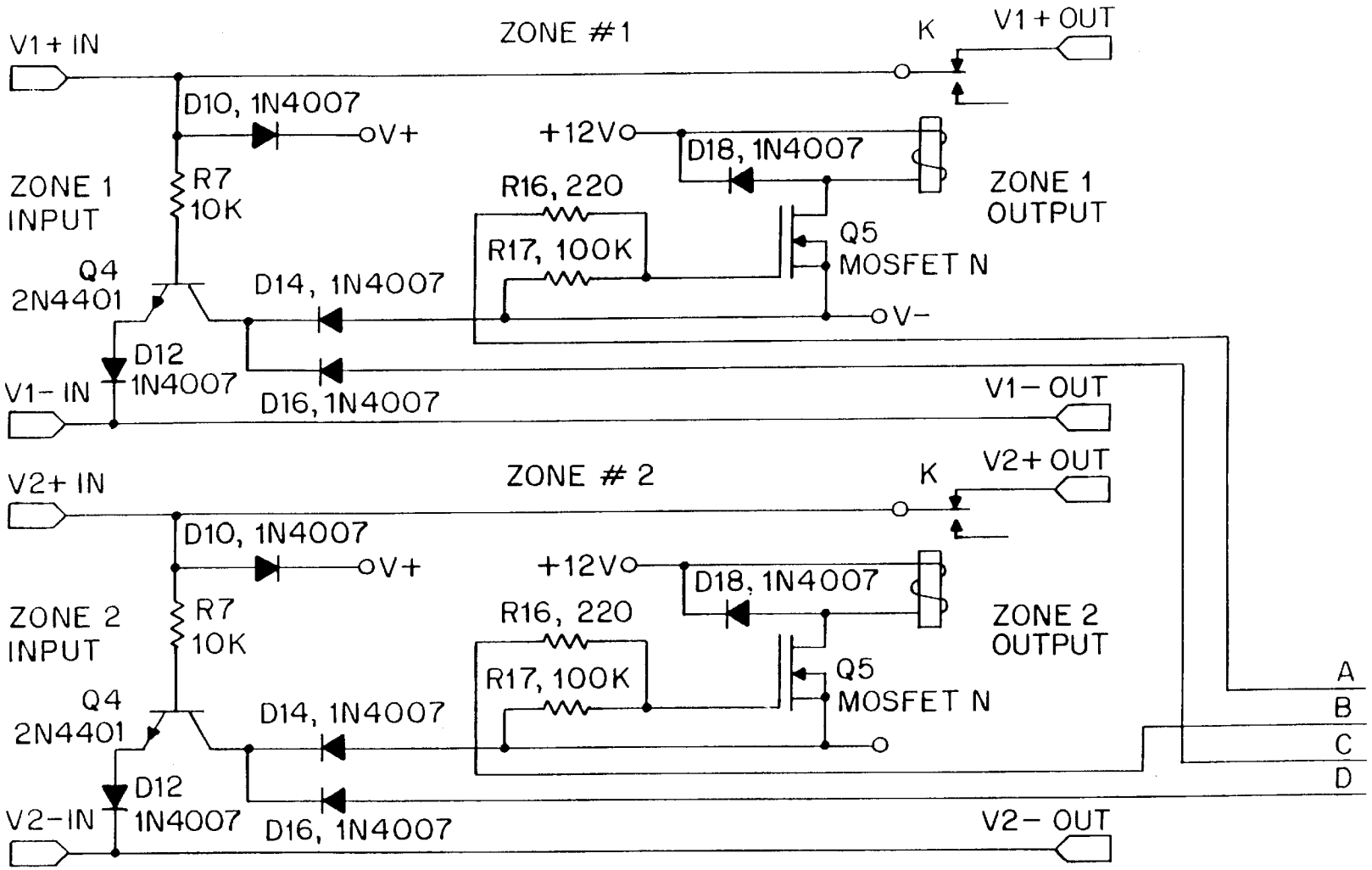
FIGS. 9 and 10, when placed together as shown in FIG. 11, is a circuit diagram of a 4-channel strobe synchronizing controller according to the invention.
Figure 9B:
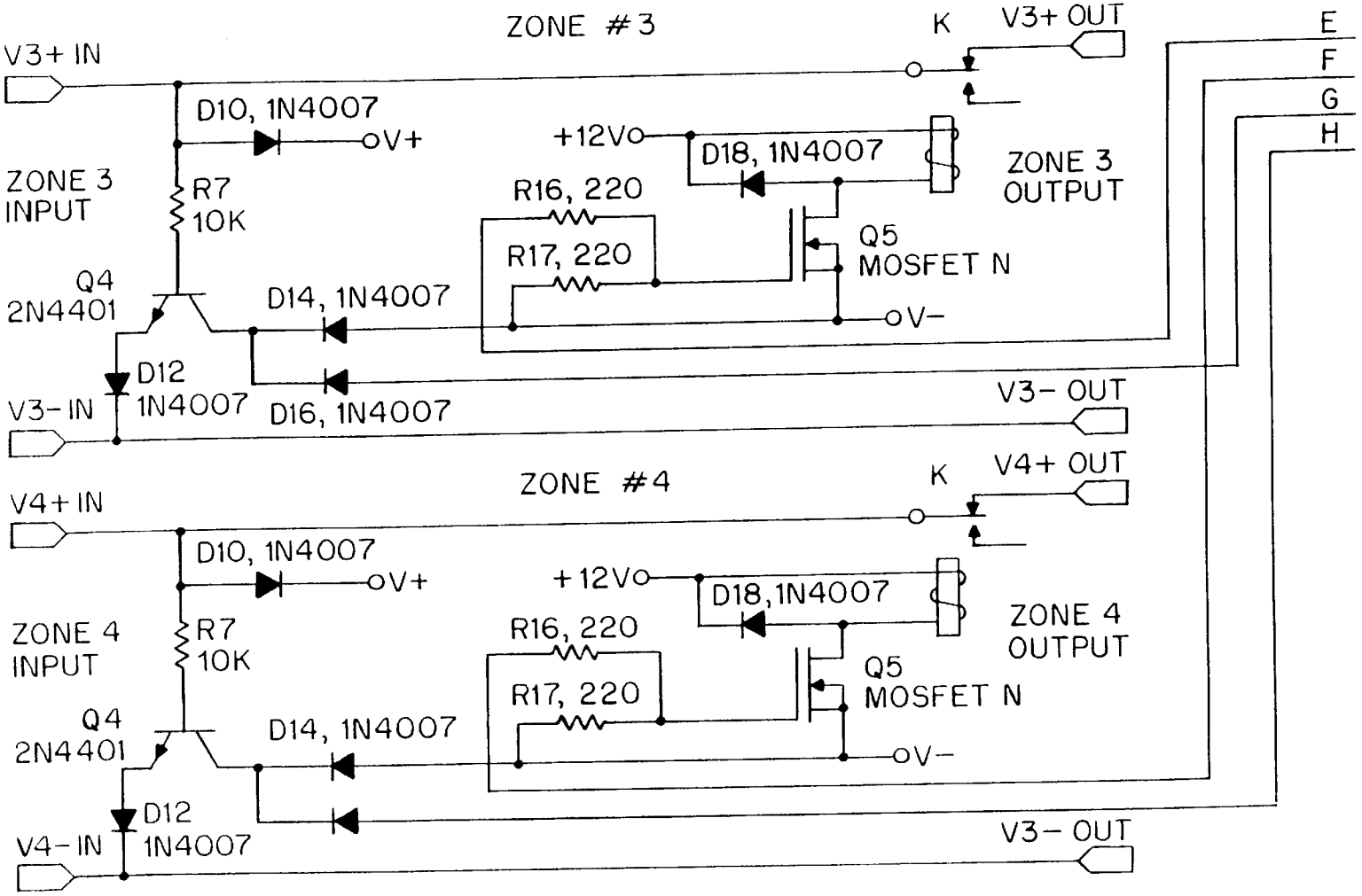
Figure 10A:
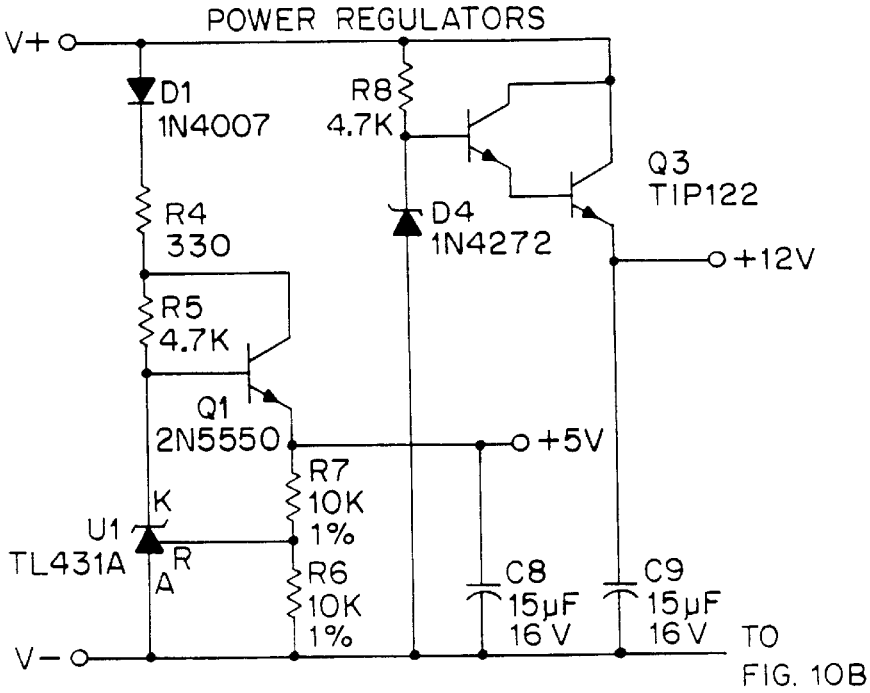
Figure 11:
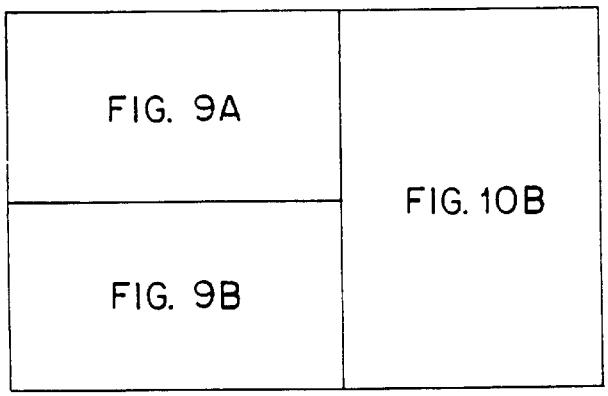
FIG. 11 is a diagram showing the arrangement of FIGS. 9 and 10.
Figure 10B:
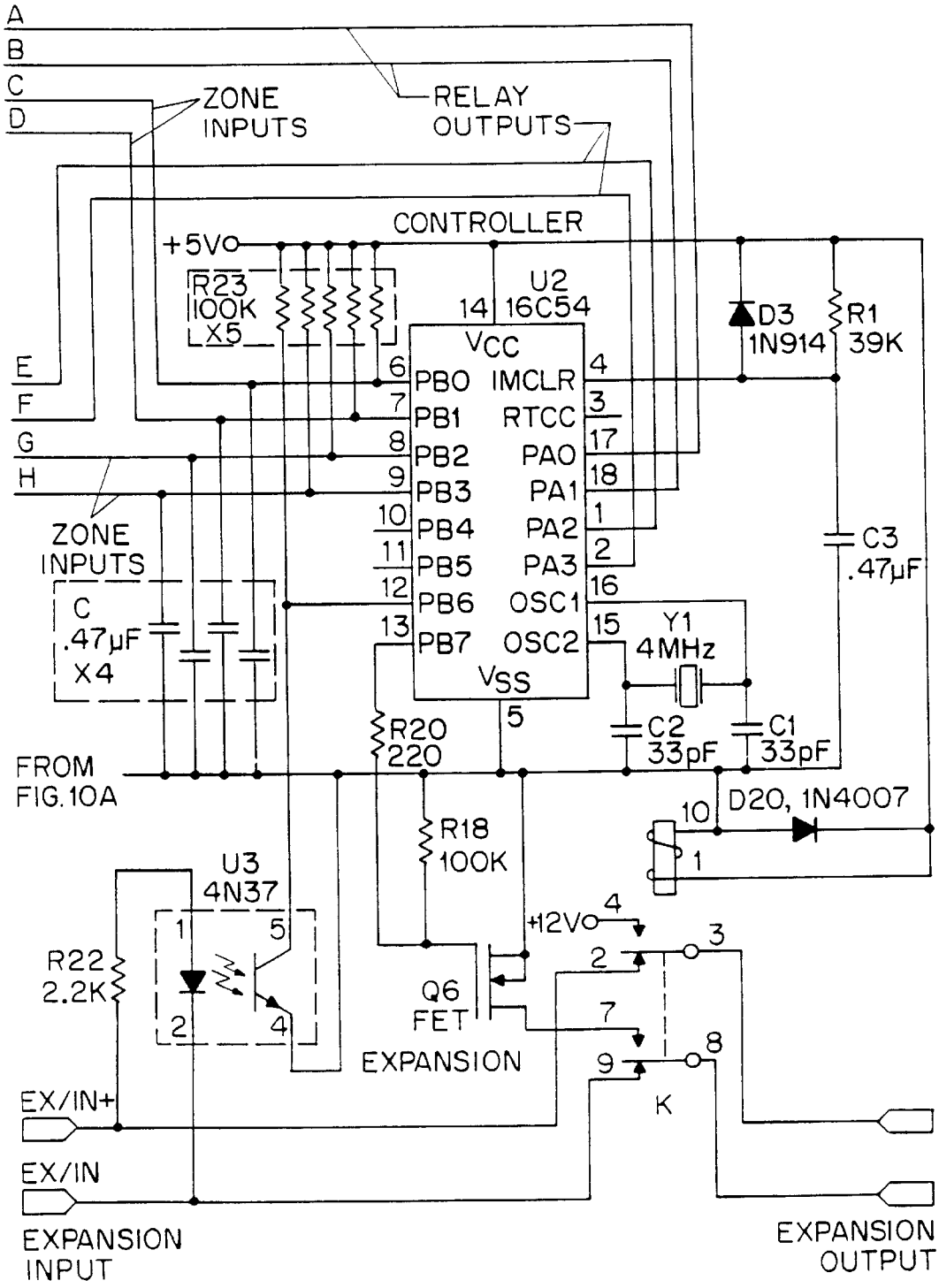

While up to this point the invention has been described in association with a fire alarm system including a fire alarm control panel which controls multiple strobes connected in a single loop, conventional fire alarm control panels may, and often do, control more than one loop of multiple strobes. The several loops may, for example, be installed in different zones or sections of a building, in which case it would not be necessary to synchronize flashing of the strobes in all of the loops, but in other situations it may be desirable to synchronize flashing in one or more of loops presenting an alarm condition. The control unit illustrated in FIG. 3 could not by itself perform these functions, yet in the interest of cost it is desirable to avoid having to provide a separate controller for each of the loops. The control circuit shown in FIGS. 9 and 10 enables one microcontroller to control up to four separate loops or zones, and may be expanded to control one or more additional controllers each capable of controlling an additional four loops of strobes. Referring to FIGS. 9 and 10, in which components common to FIG. 3 are correspondingly identified, a single microcontroller U2, which may be a PIC16C54, is capable of controlling up to four loops of strobes (not shown) which are connected to the positive and negative OUTPUT terminals of four relay circuits labeled ZONE 1, ZONE 2, ZONE 3 and ZONE 4, respectively. When and only when an alarm condition is present in a zone, a D.C. voltage, typically 24 volts, is applied across its positive and negative INPUT terminals, and a relay K connected to the positive terminal when in the condition shown in FIG. 9, supplies this voltage to the strobes connected in a loop to that zone. As will be described presently, the microcontroller U2 produces signals at its output pins 6, 7, 8 and 9 which are applied to control circuitry in ZONES 1, 2, 3 and 4, respectively, which momentarily open a corresponding relay K, for a period of 10–30 milliseconds, thereby interrupting power to and triggering flashing of the strobes powered through that relay.

Referring in detail to FIG. 9 and the ZONE 1 circuitry, the positive side of the D.C. input voltage is coupled through a diode D10 to a terminal labeled "V+" and a negative side is coupled through a diode D12, the emitter-collector path of a bipolar NPN transistor Q4 and a diode D14 to a terminal labeled "V−". A potential exists between these V+ and V− terminal only when a D.C. potential, $V_{in}$, is applied to the ZONE 1 input terminals. The same is true of the ZONE 2, ZONE 3 and ZONE 4 circuits, namely, that a potential appears across their V+ and V− terminals when, and only when, a D.C. potential indicating an alarm condition is applied to their input terminals. The terminals labeled "V+" in all four zones are actually internally connected together and to a similarly labeled terminal of a power regulator circuit (FIG. 10) and the terminals labeled "V−" in all four zones are internally connected together and to the negative side of the power regulator circuit. Thus, a potential is applied across the "V+" and "V−" terminals of the power regulator only if one or more of the four zones is energized.

To enable the microcontroller to determine which of the four zones is energized, particularly when more than one are energized at the same time, each is isolated from the others by an isolation circuit including the aforementioned diodes D10, D12, D14 and transistor Q4 and a resistor R15 connected between the positive side of the D.C. input voltage and the base electrode of transistor Q4. Diode D10 is a blocking diode which prevents current flow from the commonly-connected "V+" terminals to other zones and also prevents current from such common circuit from forward-biasing transistor Q4 when a zone, say ZONE 1, is energized. The negative side of the input D.C. is coupled via diode D12, transistor Q4 and another diode D16 onto a respective ZONE INPUT line to a respective one of four inputs to microcontroller U2 labeled PB0, PB1, PB2 and PB3, respectively. Each of these ZONE INPUT lines is connected via a respective resistor R to a regulated +5.00 volts supply (to be described) and via a respective capacitor C to the negative side of the supply.

Regulated voltages for operating the system are supplied by the POWER REGULATORS shown in FIG. 10 when, and only when, one or more of the zones are actuated so as to provide a potential, typically 24 volts, between the internally connected terminals labeled "V+" and "V−". A voltage of 5.0 volts ±1% is produced at an output terminal labeled "+5 V" by a regulator which includes a diode D1, resistors R4 and R5 and an integrated circuit U1 which acts as a controlled Zener, connected in series in that order from the V+ terminal to the V− terminal of the supply, a transistor Q1 having its base electrode connected to the junction of resistor R5 and integrated circuit U1, its collector connected to the junction of resistors R4 and R5, and its emitter connected through series-connected resistors R7 and R6 to the V− terminal of the power supply. The junction of resistors R6 and R7 is connected to the control pin of integrated circuit U1. A regulated potential of 5.0 volts produced at the emitter of transistor Q1 is filtered by a capacitor C8, and applied via an internally connected terminal, also labeled "+5 V" to the $V_{cc}$ input of the microcontroller. The $V_{ss}$ input of the controller is connected to the V− terminal of the power supply.

A regulator for producing a potential of 12 volts required for operation of ZONE and EXPANSION relays includes a resistor R8 and a Zener diode D4 connected in series across the supply, and a Darlington transistor pair Q3 connected in parallel with resistor R8 and in series with a filter capacitor C9. The regulated 12 volts produced at the output emitter of the Darlington pair appears at a terminal labeled "+12 V" which is internally connected to a similarly labeled terminal in each of the ZONE circuits and also in the EXPANSION circuit. It is again emphasized that the controller is powered only when at least one ZONE is energized.

The clock frequency of the microcontroller is determined by a 4 MHz resonator Y1 and a pair of capacitors C1 and C2 connected to the OSC1 and OSC2 terminals, respectively, of the controller. When energized upon the occurrence of an alarm condition in a ZONE, the microcontroller is programmed to monitor the ZONE INPUTS and ascertain which of them is activated, and then toggles a relay K in the circuitry for the corresponding ZONE for a period in the range from 10 to 30 milliseconds, thereby briefly interrupting the application flow of power to the strobes associated with that ZONE.

More particularly, and assuming that the microcontroller has sensed that ZONE 1 has been energized, after a delay of 2.9 seconds following initial sensing of the alarm condition, a +5.00 volts signal is produced at output terminal PA0 (Pin 17) and coupled via a respective RELAY OUTPUT line to the gate electrode of a MOSFET Q5 via a voltage divider including resistors R16 and R17 connected in series and to the terminal "V−". The junction of resistors R16 and R17 is connected to the gate electrode of Q5, the source and drain electrodes of which are connected in series with the coil of relay K across the power supply represented by terminals "V+" and "V−". When switch Q5 is turned "ON" by the signal from Pin 17, relay K is activated, thereby interrupting power flow to the strobes for a short, hardly noticeable, interval. An optional diode D18 connected across the relay coil suppresses the reverse EMF spike that is generated when switch Q5 is opened, but may be omitted in the interest of increasing the switching speed of the relay.

If, for example, the controller also senses an alarm condition in ZONE 4, a +5.00 volts signal is also produced at output terminal PA3 (Pin 2) which turns "ON" the MOSFET and actuates the relay K in the ZONE 4 circuit in synchronism with actuation of the relay in the ZONE 1 circuit, whereby the strobes in the loops associated with both zones will be fired at the same time. Alternatively, to preclude the creation of possible anomalies in current flow that might result from all strobes in the four loops flashing at the same time, the microcontroller may be programmed to interrupt the power in the four loops at staggered times within the 2.9 seconds interval. That is to say, the 2.9 seconds interval may be divided into four time slots of approximately 0.75 second each in which triggering of the four zones is initiated sequentially. The flashing would be harmonious, if not synchronous, but would meet Underwriters Laboratories' specifications for flash rates.

Figure 13:
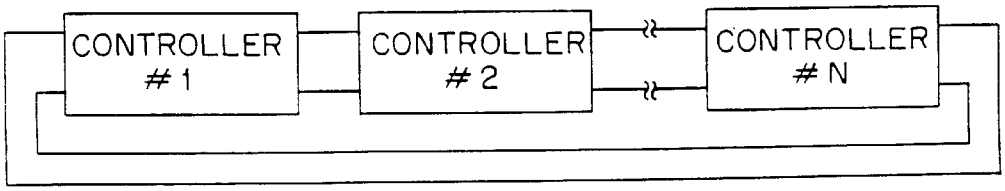
FIG. 13 is a simplified block diagram showing the interconnection of a plurality of a 4-channel controllers of the kind illustrated in FIGS. 9 and 10.

In accordance with another aspect of the invention, synchronized firing of the strobes in more than four loops can be controlled by providing the controller with an EXPANSION circuit having EXPANSION INPUT and EXPANSION OUTPUT terminals, as shown in the lower right-hand portion of FIG. 10, which are connected in "daisy-chain" fashion as depicted in FIG. 13, to the EXPANSION INPUT and EXPANSION OUTPUT terminals of one or more similarly equipped controller of the kind just described, each for controlling four loops of flash units. More particularly, the expansion output terminals of a first controller, labeled "CONT. #1" are connected to the expansion input terminals of a second controller, CONT. #2, the expansion output terminals of which are connected to the expansion input terminals of a third controller, and so on, with the expansion output terminals of the last controller of the chain connected back to the expansion input terminals of the first. By connecting multiple controllers in this way, sync signals generated by one controller in the chain as a consequence of an alarm condition occurring in at least one of its associated ZONES, may be transferred to the other controllers in the chain. Because each of the interconnected controllers is equally likely to experience an alarm condition, and there is no way of knowing when, if ever, a particular controller will be energized by occurrence of an alarm condition, the EXPANSION circuit of each controller must be able to transfer sync signals from the EXPANSION INPUT terminals to the EXPANSION OUTPUT terminals whether the controller is powered or not.

To this end, the EXPANSION circuit includes a relay K, the coil of which is connected between the "+5 V" and "V−" terminals of the microcontroller and shunted by a diode D20 for suppressing the back EMF spike created when current through the coil is turned off. In the event of no power on any of the four zones, with the consequence that the microcontroller U2 is not energized, the relay contacts are in the illustrated non-energized position and accordingly by-pass the controller. That is, contact 2 and contactor 3 and contact 9 and contactor 8 respectively directly connect positive and negative EXPANSION INPUT terminals to positive and negative EXPANSION OUTPUT terminals.

however, when an alarm condition occurs in at least one ZONE to cause powering of the controller, current flows through the relay coil from the +5 V bus to the negative side of the supply and actuates the relay, whereby a +12 V potential is coupled through contact 4 and contractor 3 to the positive EXPANSION OUTPUT terminal and the drain electrode of a MOSFET Q6 is coupled through contact 7 and contactor 8 to the negative EXPANSION OUTPUT terminal, and the positive and negative EXPANSION INPUT terminals are both disconnected. As a consequence the relay K no longer by-passes the controller to transfer any sync signal generated by another controller in the chain and appearing on the EXPANSION INPUT line to the next successive controller. The by-pass function is restored by a circuit including an optocoupler U3, the light emitting diode of which is connected in series with a resistor 22 across the EXPANSION INPUT lines, and the transistor output portion of which is connected in series with a resistor R23 between the "+5 V" and "V−"terminals of the POWER REGULATORS. The junction between resistor R23 and the collector of the transistor is connected to terminal PB6 (Pin 12) of controller U2. If at least one ZONE associated within another interconnected controller is energized, there will be a 12 volt D.C. potential across the EXPANSION INPUT lines, causing the optocoupler diode to conduct and turn "on" the transistor portion. Conduction of the transistor portion pulls the potential on Pin 12 of the controller from +5 V to zero, which the controller is programmed to sense and cause terminal PB7 (Pin 13) to go "high". This voltage pulse is applied to the gate electrode MOSFET Q6 via a voltage divider including resistors R18 and R20, which turns Q6 "on" and causes current flow in the diode portion of the optocoupler connected to the EXPANSION INPUT terminals of the next controller in the chain. Thus, when the controller is powered, the "expansion" sync signal is received through the optocoupler and under control of the microcontroller is forwarded via switch Q6 to the next controller.

Figure 12:
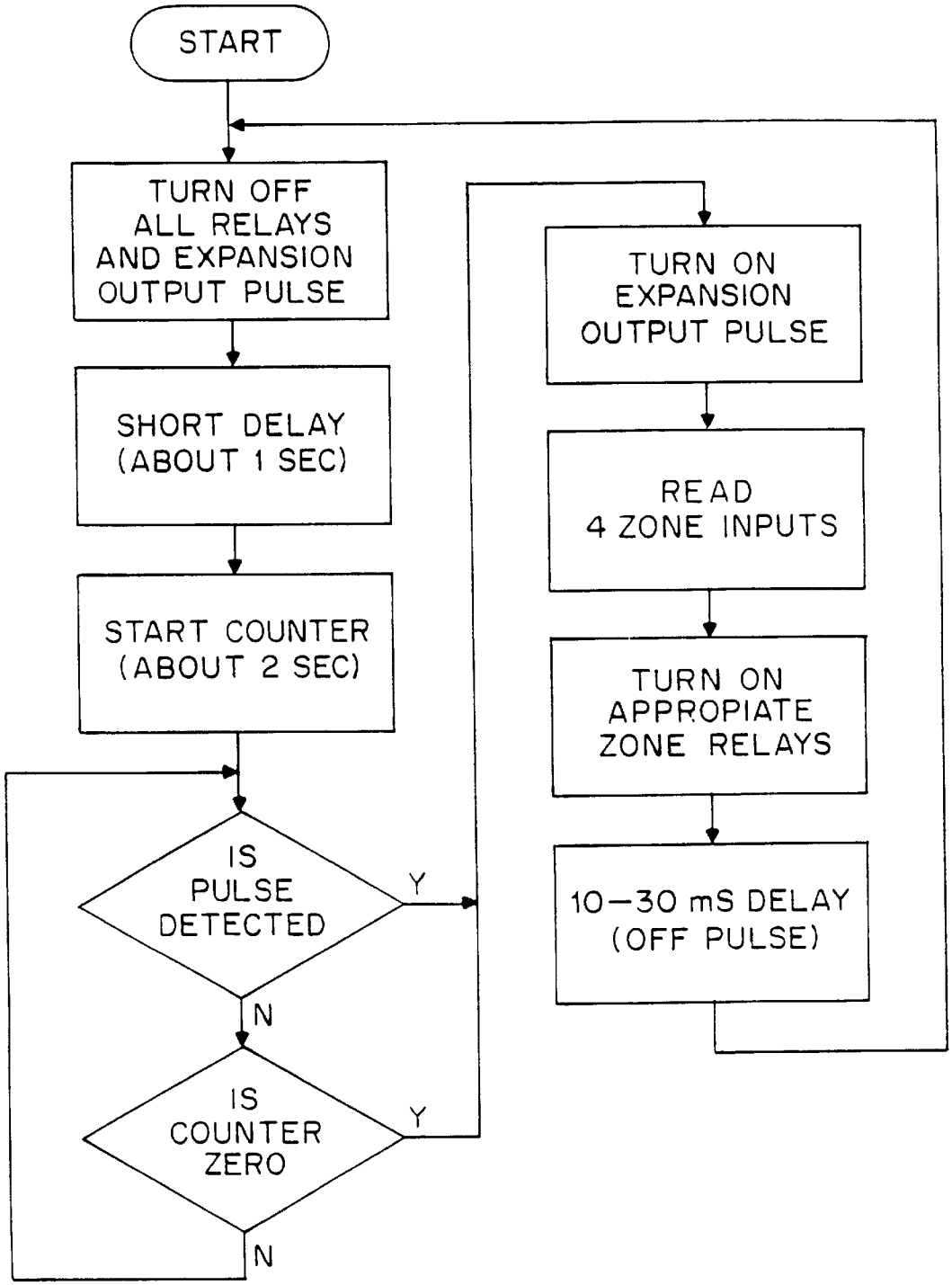
FIG. 12 is a flow chart of the functions of the strobe synchronizing controller of FIGS. 9 and 10.

Referring now to the flow chart of FIG. 12, following START the controller initially turns "off" all relays, that is, the relay in each of the ZONE circuits, and also turns "OFF" the "expansion output pulse" to MOSFET Q6. Following a short delay of about 1 second, a counter is started which counts for about 2 seconds after which Pin 12 is read to determine whether it is at +5 volts, indicating no expansion input, or zero in case there is an input. If the answer is "No" the count of the counter is checked to ascertain whether the 2 seconds has elapsed and, if not, pin 12 is again read. A "Yes" decision from either diamond turns "ON" the expansion output pulse to MOSFET Q6 to pass a signal on to the next controller. Then, the four zone inputs (Pins 6, 7, 8 and 9) are scanned to determine which is "ON" or energized; it will be recalled that at least one must be on, otherwise there will be no operating power for the controller. When the "ON" zone or zones have been identified, a relay output signal is applied to and turns on the corresponding zone relays and thereby interrupt power to the associated loop-connected strobes for a short period, in the range from 10 to 30 milliseconds, following which the cycle is repeated.

Figure 14:
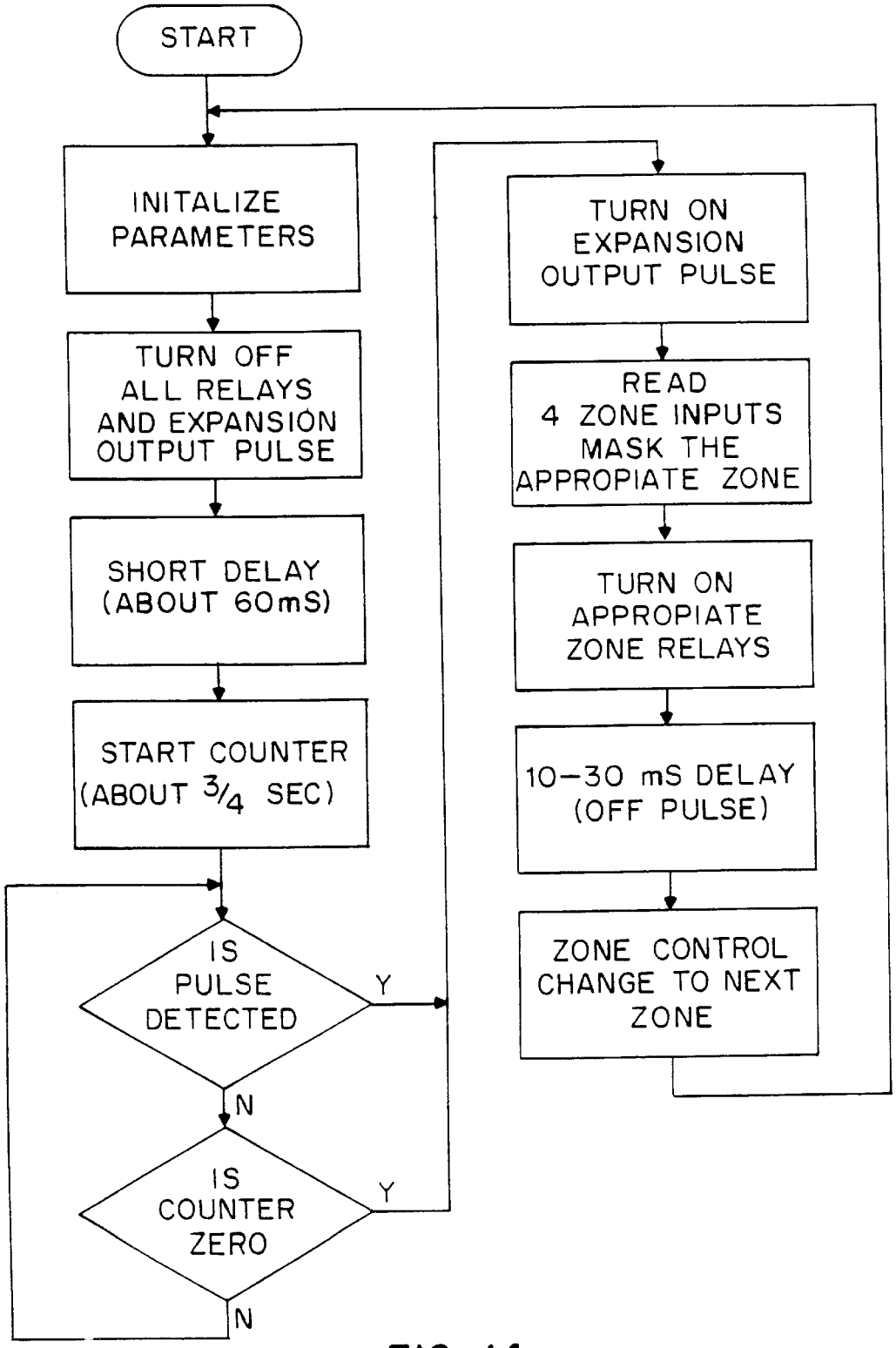
FIG. 14 is a simplified flow chart of alternative functions of the strobe synchronizing controller of FIGS. 9 and 10.

As noted earlier, to preclude the creation of possible anomalies in current flow that might result should all of the strobes in all of the loops be flashing at the same time, the microcontroller may be programmed to interrupt the power supplied to the loops at staggered times within the 2.9 seconds interval. Referring to the simplified flow chart of FIG. 14 which outlines the program, following START the controller initializes parameters and then turns "off" all relays, namely, the relay in each of the ZONE circuits, and also turns "OFF" the "expansion output pulse" to switch Q6. Following a short delay of about 60 milliseconds, a counter is started which counts for about ¾ second after which Pin 12 is read to determine whether it is at 5 volts indicating no expansion pulse input, or zero in case there is an input. If the answer is "No" the count is checked to ascertain whether the ¾ second has elapsed and if not, Pin 12 is again read. A "Yes" decision from either diamond turns on the expansion output pulse to switch Q6 to pass a sync signal to the next controller. Then a first of the four zone inputs (e.g., Pin 6) is scanned to determine if it is "ON" and if energized, a relay output signal is applied to and turns on that zone relay and thereby interrupts power to the associated strobes for a period in the range from 10 to 30 milliseconds. Next the microcontroller repeats the process successively scanning the remaining three zone inputs and applying relay output signals to appropriate zone relays. The net result is that the energized flash units in the four zones are triggered sequentially at ¾ second intervals within a period of about 3 seconds.

We claim:

1. A control circuit for synchronously firing at a predetermined rate of plurality of flash units each of which has a timer trigger circuit which normally fires the unit independently of the others, comprising:

a two-conductor power distribution line to which each of a plurality of flash units is connected through a respective timer trigger circuit and through a respective sync trigger circuit connected in parallel with a corresponding timer trigger circuit;

a sync control circuit having input terminals connected across a D.C. power source and output terminals connected to said power distribution line, said sync control circuit comprising:

first controlled switching means connected in series between said input terminals and said output terminals for supplying power from said D.C. power source to said plurality of flash units [when and only when an alarm condition is present]; and timer means connected across said input terminals and receiving power from said D.C. power source when and only when an alarm condition is present, for actuating said first controlled switching means and briefly interrupting the supply of power to said power distribution line at said predetermined rate for producing a sync signal for causing said sync trigger circuits all to simultaneously fire its respective flash unit and for re-setting the timer trigger circuit of each flash unit to enable it to trigger the unit in the event no sync signal arrives after elapse of a predetermined period following the last previous sync signal.

2. A control circuit according to claim 1 *or claim 25*, wherein said first controlled switching means comprises relay means having normally closed contacts connected between said input terminals and said output terminals, and a coil connected in series with a normally open switch across said input terminals, wherein said switch is closed at said predetermined rate by pulse signals generated by said timer [circuit] *means* for causing said normally closed contacts to briefly open.

3. A control circuit according to claim 2, wherein said timer [circuit] *means* comprises a microcontroller programmed to generate pulse signals having a duration in the range from 10 to 30 milliseconds at intervals of about 2.9 seconds.

4. A control circuit according to claim 1, wherein each flash unit comprises a first capacitor connected in parallel with a flash tube across said two-conductor power distribution line, first switch means for connecting and disconnecting an inductor across said two-conductor power distribution line to store energy in said inductor during periods of connection and causing energy to be transferred from said inductor to said capacitor during periods of disconnection of said first switch means, means including optocoupler means connected across said power distribution line for repetitively cycling said first switch means between open and closed states, and wherein the timer trigger circuit includes second switch means coupled to and operable to fire a respective flashtube when the timer trigger circuit has timed out.

5. A control circuit according to claim 4, wherein each flash unit further comprises means for limiting the energy coupled from said inductor to said first capacitor to that necessary to cause firing of said flashtube with a specified brightness at a specified rate.

6. A control circuit according to claim 5, wherein said optocoupler means comprises a light-emitting diode and a transistor having base, emitter and collector electrodes, and wherein said energy-limiting means comprises a Zener diode connected between the base electrode of the optocoupler transistor to a terminal of said first capacitor and poled to cause said optocoupler to stop cycling said first switch means when the voltage on said first capacitor has attained the threshold firing voltage of said flashtube.

7. A control circuit according to claim 4, wherein said second switch means of each timer trigger circuit includes an SCR.

8. A control circuit according to claim 7, wherein each sync trigger circuit includes a first resistor and a second capacitor connected in series across a supply of D.C. voltage having an amplitude lower than that of said D.C. power source, third switch means and a second resistor serially connected across said second capacitor, and means connecting the junction between said third switch means and said second resistor to a gate electrode of the SCR included in the respective timer trigger circuit.

9. A control circuit according to claim 7, wherein the timing trigger circuit and the sync trigger circuit in each flash unit share a common timing signal generator which in the absence of sync signals generates and applies trigger pulses to the gate electrode of said SCR at a predetermined frequency for causing said flashtube to flash at a first rate, and which in response to application of sync pulses generates and applies trigger pulses to the gate electrode of said SCR at said predetermined rate.

10. A control circuit according to claim 1, wherein each flash unit comprises a first capacitor connected in parallel with a flashtube, means including first switch means for connecting and disconnecting an inductor across said power distribution line to store energy in said inductor during periods of connection and causing energy to be transferred from said inductor to said first capacitor during periods of disconnection of said *first switch* means, means including microcontroller means connected across said power distribution line programmed for repetitively cycling said first switch means between its open and closed states until said first capacitor is charged to the threshold firing voltage of said flashtube, wherein the timer trigger circuit and the sync trigger circuit of each flash unit share a triggering circuit which includes an SCR [connected in parallel with] *electrically coupled to* said flashtube, and wherein said microcontroller means, in the absence of sync signals, generates and applies trigger pulses to a gate electrode of said SCR at a predetermined frequency for causing the flashtube to flash at a first rate, and in response to the application of sync signals generates and applies trigger pulses to the gate electrode of said SCR at said predetermined rate.

11. A control system for synchronously firing at a predetermined rate separate groups of flash units, each group for providing visual alarm signals to a given zone and [consisting of] *comprising* a plurality of flash units each having an individual timing trigger circuit which normally fires independently of one another comprising:

for each zone, a two-conductor power distribution line to which each of the plurality of flash units included in the group is connected through a respective timer trigger circuit, and a respective sync trigger circuit;

a sync control circuit which includes, for each zone, first controlled switching means having input terminals connected across a D.C. power source and output terminals connected to said power distribution line for supplying power from said source to all of the plurality of flash units in the zone [when, and only when, an alarm condition is present in that zone]; and circuit means including a microcontroller and a power supply therefor connected to the *first* controlled switching means for all of said zones for supplying power to said microcontroller when, and only when, power from said D.C. source is applied to at least one group of flash units, and wherein said microcontroller is coupled to and is programmed to [ascertain to which zone or zones power is being supplied and to] generate and apply to the first controlled switching means of [said powered] *a* zone or zones a signal for actuating the same for briefly interrupting the supply of power to the power distribution line connected to the powered zone or zones and producing a sync signal for causing the corresponding sync trigger circuits to fire all of the flash units connected to the powered distribution line or lines, and for re-setting the timer trigger circuit of all of the flash units connected to the powered distribution line or lines for enabling them to trigger a respective flash unit in the event no sync signal arrives after elapse of a predetermined time period following the last previous sync signal.

12. A control system according to claim 11 *or claim 26*, wherein each of said first controlled witching means comprises relay means having normally closed contacts connected between said input and output terminals, and a coil connected in series with a normally open switch across a D.C. voltage source, wherein said normally open switch is briefly closed at said predetermined rate by pulse signals generated and applied thereto by said microcontroller for causing brief opening of said normally closed contacts.

13. A control system according to claim 12, wherein said microcontroller is programmed to generate pulse signals having a duration in the range from 10 to 30 milliseconds at intervals of about 2.9 seconds.

14. A control [circuit] *system* according to claim 11, wherein each flash unit comprises a first capacitor connected in parallel with a flashtube across said two-conductor power distribution line, means including first switch means for connecting and disconnecting an inductor across said two-conductor power distribution line to store energy in said inductor during periods of connection and causing energy to be transferred from said inductor to said first capacitor during periods of disconnection of said means, means including optocoupler means connected across said power distribution line for repetitively cycling said first switch means between open and closed states, and wherein the timer trigger circuit includes second switch means coupled to and operable to fire its respective flashtube when the timer trigger circuit has timed out.

15. A control [circuit] *system* according to claim 14, wherein each flash unit further comprises means for limiting the energy coupled from said inductor to said first capacitor to that necessary to cause firing of said flashtube with a specified brightness at a specified rate.

16. A control [circuit] *system* according to claim 15, wherein said optocoupler means comprises a light-emitting diode and a transistor having base, emitter and collector electrodes, and wherein said energy-limiting means comprises a Zener diode connected between the base electrode of the optocoupler transistor to a terminal of said first capacitor and poled to cause said optocoupler to stop cycling said first switch means when the voltage on said first capacitor has attained the threshold firing voltage of said flashtube.

17. A control [circuit] *system* according to claim 14, wherein said second switch means of each timer trigger circuit includes an SCR.

18. A control [circuit] *system* according to claim 17, wherein each sync trigger circuit includes a first resistor and a second capacitor connected in series across a supply of D.C. voltage having an amplitude lower than that of said D.C. power source, third switch means and a second resistor serially connected across said second capacitor, and means connecting the junction between said third switch means and said second resistor to the gate electrode of the SCR included in the respective timer trigger circuit.

19. A control [circuit] *system* according to claim 17, wherein the timing trigger circuit and the sync trigger circuit in each flash unit share a common timing signal generator which in the absence of the sync signals generates and applies trigger pulses to the gate electrode of said SCR at a predetermined frequency for causing said flashtube to flash at a first rate, and which in response to application of sync signals generates and applies trigger pulses to the gate electrode of said SCR at said predetermined rate.

20. A control [circuit] *system* according to claim 11, wherein each flash unit comprises a first capacitor connected in parallel with a flashtube, means including first switch means for connecting and disconnecting an inductor across a respective power distribution line to store energy in said inductor during periods of connection and causing energy to be transferred from said inductor to said first capacitor during periods of disconnection of said *first switch* means, mean including microcontroller means connected across said power distribution line programmed for repetitively cycling said first switch means between open and closed states until said first capacitor is charged to the threshold firing voltage of said flashtube, wherein the timer trigger circuit and the sync trigger circuit of each flash unit share a flashtube triggering circuit which includes an SCR, and wherein said microcontroller means, in the absence of sync signals, generates and applies trigger pulses to a gate electrode of said SCR at a predetermined frequency for causing the flashtube to flash at a first rate, and in response to the application of sync signals generates and applies trigger pulses to the gate electrode of said SCR at said predetermined rate.

21. A control system comprising two or more control systems as defined in claim 11 *or claim 26* each for synchronously firing at a predetermined rate respective separate groups of flash units, wherein the microcontroller of each of said two or more control systems includes an expansion circuit having expansion input terminals and expansion output terminals, and wherein the expansion output terminals of each are connected to the expansion input terminals of another in "daisy-chain" fashion, and wherein each expansion circuit includes means for transferring sync signals from its expansion input terminals to its expansion output terminals whether or not its respective microcontroller is powered.

22. A control system according to claim 21, wherein said means for transferring sync signals when the respective microcontroller is not powered comprises relay means having normally closed contacts connected between said expansion input terminals and said expansion output terminals and a coil connected across its power supply for said microcontroller, and wherein said means for transferring sync signals when the respective microcontroller is powered, and therefore energizes said relay means to open said normally closed contacts, comprises means including optocoupler means connected between said expansion input terminals and said microcontroller for receiving and forwarding any sync signals appearing on said expansion input terminals to the optocoupler means of the next successive microcontroller.

23. A control system for firing separate groups of flash units sequentially all within a predetermined time interval and each at a predetermined rate, each group for providing visual alarm signals to a given zone and [consisting of] *comprising* a plurality of flash units each having an individual timing trigger circuit which normally fires the unit independently of the others, comprising:

for each zone, a two-conductor power distribution line to which each of the plurality of flash units included in the group is connected through a respective timer trigger circuit and a respective sync trigger circuit;

a sync control circuit which includes, for each zone, first controlled switching means having input terminals connected across a D.C. power source and output terminals connected to said two-conductor distribution line for supplying power from said source to all of the plurality of flash units in that zone [when, and only when, an alarm condition is present in that zone]; and circuit means including a microcontroller and a power supply therefor connected to the *first* controlled switching means for [all] *each* of said zones for supplying power to said microcontroller when, and only when, power from said D.C. source is applied to the flash units associated with at least one zone, and wherein said microcontroller is coupled to and is programmed to [ascertain to which zone or zones power is being supplied and to] generate and to sequentially apply to the first controlled switching means of each of said zones a pulse signal for actuating the same at staggered times within a predetermined time interval for briefly interrupting the supply of power, if present, to the associated power distribution line and producing a sync signal for causing the corresponding sync trigger circuits to be fired, and for re-setting the timer trigger circuit for all flash units connected to a powered distribution line for enabling them to trigger a respective flash unit in the event no sync signal arrives after elapse of a predetermined time period following the last previous sync signal.

24. A control system according to claim 23 *or claim 27*, wherein said system includes four groups of flash units, and wherein said microcontroller is programmed to generate four equally spaced pulse signals within an interval of about 2.9 seconds and to apply successive pulse signals each to a different one of said four groups of flash units.

*25. A control circuit for synchronously firing at a predetermined rate a plurality of flash units of a fire alarm warning system, said system including a fire alarm control panel having a power supply for the system, comprising:*

*a two-conductor power distribution line to which each of said plurality of flash units is connected through a respective sync trigger circuit;*

*a sync control circuit having input terminals connected to said system power supply and output terminals connected to said power distribution line;*

*said sync control circuit further including (1) first controlled switching means electrically connected between said input terminals and said output terminals for supplying power from said system power supply to said plurality of flash units and (2) means connected to said input terminals and receiving power from said system power supply when, and only when, an alarm condition is present for actuating said first controlled switching means and briefly interrupting the supply of power to said power distribution line at said predetermined rate to produce sync signals at said predetermined rate; and*

*said sync signals being operative to simultaneously actuate the respective sync trigger circuits of said flash units and cause said strobe alarm units to flash at said predetermined rate.*

*26. A control circuit according to claim 25, wherein each flash unit comprises a first capacitor connected in parallel with a flash tube across said two-conductor power distribution line, first switch means for connecting and disconnecting an inductor across said two-conductor power distribution line to store energy in said inductor during periods of connection and causing energy to be transferred from said inductor to said capacitor during periods of disconnection of said first switch means, and means including optocoupler means connected across said power distribution line for repetitively cycling said first switch means between open and closed states.*

*27. A control circuit according to claim 26, wherein each flash unit further comprises means for limiting the energy coupled from said inductor to said first capacitor to that necessary to cause firing of said flashtube with a specified brightness at a specified rate.*

*28. A control circuit according to claim 27, wherein said optocoupler means comprises a light-emitting diode and a transistor having base, emitter and collector electrodes, and wherein said energy-limiting means comprises a Zener diode connected between the base electrode of the optocoupler transistor to a terminal of said first capacitor and poled to cause said optocoupler to stop cycling said first switch means when the voltage on said first capacitor has attained the threshold firing voltage of said flashtube.*

*29. A control system for synchronously firing at a predetermined rate separate groups of flash units, each group for providing visual alarm signals to a given zone and comprising a plurality of flash units, comprising:*

*for each zone, a two-conductor power distribution line to which each of the plurality of flash units included in the group is connected through a respective sync trigger circuit;*

*a sync control circuit which includes, for each zone, first controlled switching means having input terminals connected to a power source and output terminals connected to said power distribution line for supplying power from said source to all of the plurality of flash units in that zone; and*

*circuit means including a microcontroller and a power supply therefor connected to the first controlled switching means for each of said zones for supplying power to said microcontroller when, and only when, power from said source is applied to at least one group of flash units, and wherein said microcontroller is coupled to and is programmed to generate and apply to the first controlled switching means of one or more of said zones a signal for actuating the same for briefly interrupting the supply of power to the power distribution line connected to the said one or more zones and producing a sync signal for causing the corresponding sync trigger circuits to fire all of the flash units connected to the powered distribution line or lines.*

*30. A control system according to claim 29, wherein each flash unit comprises a first capacitor connected in parallel with a flashtube across said two-conductor power distribution line, means including first switch means for connecting and disconnecting an inductor across said two-conductor power distribution line to store energy in said inductor during periods of connection and causing energy to be transferred from said inductor to said first capacitor during periods of disconnection of said means, and means including optocoupler means connected across said power distribution line for repetitively cycling said first switch means between open and closed states.*

*31. A control system according to claim 30, wherein each flash unit further comprises means for limiting the energy coupled from said inductor to said first capacitor to that necessary to cause firing of said flashtube with a specified brightness at a specified rate.*

*32. A control system according to claim 31, wherein said optocoupler means comprises a light-emitting diode and a transistor having base, emitter and collector electrodes, and wherein said energy-limiting means comprises a Zener diode connected between the base electrode of the optocoupler transistor to a terminal of said first capacitor and poled to cause said optocoupler to stop cycling said first switch means when the voltage on said first capacitor has attained the threshold firing voltage of said flashtube.*

*33. A control system for firing separate groups of flash units sequentially all within a predetermined time interval and each at a predetermined rate, each group for providing visual alarm signals to a given zone and comprising a plurality of flash units, comprising:*

*for each zone, a two-conductor power distribution line to which each of the plurality of flash units included in the group is connected through a respective sync trigger circuit;*

*a sync control circuit which includes for each zone, first controlled switching means having input terminals connected to a power source and output terminals connected to said two-conductor distribution line for supplying power from said source to all of the plurality of flash units in that zone; and*

*circuit means including a microcontroller and a power supply therefor connected to the first controlled switching means for each of said zones for supplying power to said microcontroller when, and only when, power from said source is applied to the flash units associated with at least one zone, and wherein said microcontroller is coupled to and is programmed to generate and to sequentially apply to the first controlled switching means of each of said zones a pulse signal for actuating the same at staggered times within a predetermined time interval for briefly interrupting the supply of power, if present, to the associated power distribution line and producing a sync signal for causing the corresponding sync trigger circuits to be fired.*

*34. An alarm unit for use in an alarm system, comprising:*

*means for connection to a two-conductor power distribution line as the sole source of power for the alarm unit;*

*means for producing a visual alarm signal, the visual alarm signal producing means comprising a first*

*capacitor connected in parallel with a flash tube, first switch means for connecting and disconnecting an inductor across said two-conductor power distribution line to store energy in said inductor during periods of connection of said first switch means and causing energy to be transferred from said inductor to said capacitor during periods of disconnection of said first switch means, and means for repetitively cycling said first switch means between open and closed states;*

*means for detecting interruptions of power to the alarm unit over said power distribution line; and*

*means for triggering the visual alarm signal producing means in response to the detection of a first interruption of power of a first predetermined duration of time.*

*35. The alarm unit of claim 34, wherein each flash unit further comprises means for limiting the energy coupled from said inductor to said first capacitor to that necessary to cause firing of said flashtube with a specified brightness at a specified rate.*

*36. The alarm unit of claim 35, wherein:*

*said repetitively cycling means includes optocoupler means comprising a light-emitting diode and a transistor having base, emitter and collector electrodes; and*

*said energy-limiting means comprises a Zener diode connected between the base electrode of the optocoupler transistor to a terminal of said first capacitor and poled to cause said optocoupler to stop cycling said first switch means when the voltage on said first capacitor has attained the threshold firing voltage of said flashtube.*

*37. An alarm unit for use in an alarm system, comprising:*

*means for producing a visual alarm signal;*

*means for connection to a two-conductor power distribution line as the sole source of power for the alarm unit;*

*means for detecting interruptions of power to the alarm unit over said power distribution line;*

*means for triggering the visual alarm signal producing means in response to the detection of a first interruption of power of a first predetermined duration of time; and*

*timer means for triggering the visual alarm signal producing means in the event no power interruption is detected within a predetermined time interval following the detection of a prior power interruption.*

*38. The alarm unit of claim 37, wherein the timer triggering means includes switch means coupled to and operable to fire said flashtube upon the expiration of said predetermined time interval.*

*39. The alarm unit of claim 38, wherein:*

*the switch means of the timer trigger means includes and SCR; and*

*the timer means for triggering the visual alarm signal producing means includes a first resistor and a capacitor connected in series across a voltage supply having an amplitude lower than that of the power supplied to the alarm unit, second switch means and a second resistor serially connected across said capacitor, and means connecting the junction between said second switch means and said second resistor to a gate electrode of said SCR.*

*40. The alarm unit of claim 37, wherein:*

*the visual alarm signal producing means comprises a first capacitor connected in parallel with a flashtube, means including first switch means for connecting and disconnecting an inductor across said power distribution line to store energy in said inductor during periods of connection of the first switch means and causing energy to be transferred from said inductor to said first capacitor during periods of disconnection of said first switch means, and means including microcontroller means programmed for repetitively cycling said first switch means between its open and closed states until said first capacitor is charged to the threshold firing voltage of said flashtube;*

*the timer trigger means and the means for triggering the visual alarm signal producing means in the absence of a power interruption share a triggering circuit which includes an SCR electrically coupled to said flashtube; and*

*the microcontroller means, in the absence of said power interruptions, generates and applies trigger pulses to a gate electrode of said SCR at a predetermined frequency for causing the flashtube to flash at a first rate and, in response to the detection of power interruptions, generates and applies trigger pulses to the gate electrode of said SCR.*

*41. An alarm unit for use in an alarm system, comprising:*

*means connectable to a two-conductor power distribution line for receiving power as the sole source of power for said alarm unit;* means for generating a visual alarm signal;

*means for detecting predetermined-pattern variations in said power signal and, in response thereto, for controlling the operation of said visual alarm generating means; and*

*means for causing said visual alarm signal generating means to generate a visual alarm signal in the event a first predetermined-pattern variation in said power is not again detected within a predetermined time period following the preceding detection of said first predetermined-pattern variation in said power signal.*

*42. A sync control circuit for use in an alarm system having* (1) *a fire alarm control panel with a power source,* (2) *a plurality of alarm units, and* (3) *a two-conductor power distribution line as the sole source of power for said plurality of alarm units, each of said alarm units comprising means for producing a visual alarm signal and means for triggering said visual alarm signal producing means in synchronization with all other alarm units upon receiving a sync pulse, the sync control circuit comprising:*

*a set of input terminals and a set of output terminals, the set of input terminals receiving power from said power source which is to be supplied to the alarm units over said two-conductor line;*

*a switching means connected between said set of input terminals and said set of output terminals; and*

*control means for actuating the switching means to interrupt power to the alarm units at a predetermined rate for producing a sync pulse to cause each alarm unit to produce a visual alarm signal simultaneously with the other alarm units in the system.*

*43. The sync control circuit of claim 42, further comprising timer means connected across said set of input terminals, and receiving power from said power source when, and only when, an alarm condition is present, for actuating said switching means and briefly interrupting the supply of power to said power distribution line at a predetermined rate for producing sync signals for causing the visual alarm signal producing means of the alarm units all to simultaneously generate visual alarm signals.*

*44. The sync control circuit of claim 43, wherein said switching means comprises relay means having normally closed contacts connected between said set of input terminals and said set of output terminals, and a coil connected in series with a normally open switch across said set of input terminals, wherein said switch is closed at said predetermined rate by pulse signals generated by said timer means for causing said normally closed contacts to briefly open.*

*45. The sync control circuit of claim 44, wherein said timer circuit comprises a microcontroller programmed to generate pulse signals having a duration in the range of from 10 to 30 milliseconds at said predetermined rate.*

*46. A control system according to any one of claims 11, 23, 29 and 33 wherein said microcontroller is further coupled to and programmed to ascertain to which zone or zones power is being supplied.*

*47. A system comprising two or more control system as defined in any one of claims 11, 23, 29 and 33, wherein the respective sync control circuits of said two or more control systems include expansion circuits that are electrically interconnected such that signals generated by any one of said microcontrollers for actuating the first switching means of a zone or zones controlled by said one microcontroller are electrically coupled to the other one or more microcontrollers for control of the first switching means of a zone or zones controlled by said other one or more microcontrollers.*

* * * * *

UNITED STATES PATENT AND TRADEMARK OFFICE

CERTIFICATE OF CORRECTION

PATENT NO. : RE 38,183 E
DATED : July 15, 2003
INVENTOR(S) : Kosich et al.

It is certified that error appears in the above-identified patent and that said Letters Patent is hereby corrected as shown below:

Column 1,
Line 30, “shut” should read -- shunt --

Column 2,
Line 35, “node.” should read -- mode. --

Column 7,
Table: “1 W” (first six occurrences) should read -- ¼ W --; “1 W” (seventh occurrence) should read -- ½ W --; “LC.,” (both occurrences) should read -- I.C., --; and “PIC16C34” should read -- PIC16C54 --

Column 9,
Table: “1 W” (first occurrence) should read -- ¼ W --; and “1 W” (second occurrence) should read -- ½ W --

Column 11,
Table: “SCR, 7” should read -- SCR, ? --; and “OPTCOUPLER” should read -- OPTOCOUPLER --

Column 16,
Line 57, “however” should read -- However --

Column 18,
Line 12, “of” (first occurrence) should read -- a --

Column 20,
Line 10, “the” should read -- that --
Line 34, “witching” should read -- switching --

Column 21,
Line 22, “the” (second occurrence) should be deleted
Line 36, “mean” should read -- means --

UNITED STATES PATENT AND TRADEMARK OFFICE

CERTIFICATE OF CORRECTION

PATENT NO. : RE 38,183 E
DATED : July 15, 2003
INVENTOR(S) : Kosich et al.

It is certified that error appears in the above-identified patent and that said Letters Patent is hereby corrected as shown below:

Column 25,
Line 52, "and" should read -- an --

Column 26,
Line 27, "means for generating a visual alarm signal" should be italicized (to indicate new matter added per reissue)

Signed and Sealed this

Sixteenth Day of December, 2003

JAMES E. ROGAN
*Director of the United States Patent and Trademark Office*